(12) United States Patent
Bacon, Jr. et al.

(10) Patent No.: US 7,547,105 B2
(45) Date of Patent: Jun. 16, 2009

(54) PRISMATIC RETROREFLECTIVE ARTICLE WITH CROSS-LINKED IMAGE LAYER AND METHOD OF MAKING SAME

(75) Inventors: Chester A. Bacon, Jr., Oakdale, MN (US); Bradley R. Ray, Woodbury, MN (US); Joy L. Manske, Menomonie, WI (US); Rodney A. Ough, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 189 days.

(21) Appl. No.: 11/778,216

(22) Filed: Jul. 16, 2007

(65) Prior Publication Data

US 2009/0021831 A1 Jan. 22, 2009

(51) Int. Cl.
*G02B 5/124* (2006.01)
*B32B 5/16* (2006.01)
(52) U.S. Cl. ..................... 359/530; 428/327
(58) Field of Classification Search .............. 359/530
See application file for complete search history.

(56) References Cited

U.S. PATENT DOCUMENTS

| | | | |
|---|---|---|---|
| 3,684,348 | A | 8/1972 | Rowland |
| 3,689,346 | A | 9/1972 | Rowland |
| 3,700,305 | A | 10/1972 | Bingham |
| 3,712,706 | A | 1/1973 | Stamm |
| 3,811,983 | A | 5/1974 | Rowland |
| 3,817,596 | A | 6/1974 | Tanaka |
| 3,830,682 | A | 8/1974 | Rowland |
| 3,975,083 | A | 8/1976 | Rowland |
| 4,025,159 | A | 5/1977 | McGrath |
| 4,202,600 | A | 5/1980 | Burke et al. |
| 4,243,618 | A | 1/1981 | Van Arnam |

(Continued)

FOREIGN PATENT DOCUMENTS

EP 615 788 A1 9/1994

(Continued)

OTHER PUBLICATIONS

"ASTM E810-03 Standard Test Method for Coefficient of Retroreflection of Retroreflective Sheeting Utilizing the Coplanar Geometry", ASTM International, West Conshohocken, PA., Approved Feb. 10, 2003, Published Apr. 2003, 8 pages.

(Continued)

*Primary Examiner*—James Phan
(74) *Attorney, Agent, or Firm*—Nicole J. Einerson

(57) ABSTRACT

A prismatic retroreflective article and a method for making same. The retroreflective article can include a transparent polymeric body portion, an optical layer coupled to the body portion, and an image layer coupled to the body portion opposite the optical layer. The image layer can define imaged portions and non-imaged portions of the prismatic retroreflective article. The image layer can include cross-links formed between a polymer resin having hydroxyl functional groups and a cross-linking agent having isocyanate functional groups. The image layer can have a percent elongation of at least 80 percent and less than 200 percent. The method can include printing or coating an image layer onto to the body portion of the retroreflective sheeting opposite the optical layer, and cross-linking the image layer to form cross-links between the hydroxyl functional groups of the polymer resin and the isocyanate functional groups of the cross-linking agent.

30 Claims, 9 Drawing Sheets

U.S. PATENT DOCUMENTS

| | | |
|---|---|---|
| 4,332,847 A | 6/1982 | Rowland |
| 4,349,598 A | 9/1982 | White |
| 4,530,859 A | 7/1985 | Grunzinger, Jr. |
| 4,576,850 A | 3/1986 | Martens |
| 4,588,258 A | 5/1986 | Hoopman |
| 4,603,074 A | 7/1986 | Pate et al. |
| 4,609,587 A | 9/1986 | Giordano et al. |
| 4,618,518 A | 10/1986 | Pricone et al. |
| 4,672,089 A | 6/1987 | Pricone et al. |
| 4,755,425 A | 7/1988 | Huang |
| 4,775,219 A | 10/1988 | Appeldorn et al. |
| 4,801,193 A | 1/1989 | Martin |
| 4,808,471 A | 2/1989 | Grunzinger |
| 4,895,428 A | 1/1990 | Nelson et al. |
| 4,938,563 A | 7/1990 | Nelson et al. |
| 5,069,577 A | 12/1991 | Murphy |
| 5,069,964 A | 12/1991 | Tolliver et al. |
| 5,073,404 A | 12/1991 | Huang |
| 5,080,463 A | 1/1992 | Faykish et al. |
| 5,138,488 A | 8/1992 | Szczech |
| 5,169,707 A | 12/1992 | Faykish et al. |
| 5,200,851 A | 4/1993 | Coderre et al. |
| 5,213,872 A | 5/1993 | Pricone et al. |
| 5,229,882 A | 7/1993 | Rowland |
| 5,236,751 A | 8/1993 | Martin et al. |
| 5,264,063 A | 11/1993 | Martin |
| 5,376,431 A | 12/1994 | Rowland |
| 5,415,911 A | 5/1995 | Zampa et al. |
| 5,450,235 A | 9/1995 | Smith et al. |
| 5,491,586 A | 2/1996 | Phillips |
| 5,508,084 A | 4/1996 | Reeves et al. |
| 5,512,219 A | 4/1996 | Rowland et al. |
| 5,557,836 A | 9/1996 | Smith et al. |
| 5,558,740 A | 9/1996 | Bernard et al. |
| 5,559,634 A | 9/1996 | Weber |
| 5,564,870 A | 10/1996 | Benson et al. |
| 5,592,330 A | 1/1997 | Bernard |
| 5,600,484 A | 2/1997 | Benson et al. |
| 5,601,911 A | 2/1997 | Ochi et al. |
| 5,612,107 A | 3/1997 | Sangani et al. |
| 5,614,286 A | 3/1997 | Bacon, Jr. et al. |
| 5,637,173 A | 6/1997 | Martin et al. |
| 5,648,145 A | 7/1997 | Martin |
| 5,672,381 A | 9/1997 | Rajan |
| 5,691,846 A | 11/1997 | Benson, Jr. et al. |
| 5,763,049 A | 6/1998 | Frey et al. |
| 5,780,140 A | 7/1998 | Nilsen |
| 5,784,197 A | 7/1998 | Frey et al. |
| 5,812,317 A | 9/1998 | Billingsley et al. |
| 5,831,766 A | 11/1998 | Martin et al. |
| 5,888,618 A | 3/1999 | Martin |
| 5,930,041 A | 7/1999 | Thielman |
| 5,939,182 A | 8/1999 | Huang et al. |
| 5,962,108 A | 10/1999 | Nestegard et al. |
| 5,977,263 A | 11/1999 | Phillips |
| 5,988,820 A | 11/1999 | Huang et al. |
| 6,004,422 A | 12/1999 | Janovec et al. |
| 6,015,214 A | 1/2000 | Heenan et al. |
| 6,024,455 A | 2/2000 | O'Neill et al. |
| 6,048,069 A | 4/2000 | Nagaoka et al. |
| 6,054,208 A | 4/2000 | Rega et al. |
| 6,100,217 A | 8/2000 | Nagaoka |
| 6,119,751 A | 9/2000 | Nilsen et al. |
| 6,120,636 A | 9/2000 | Nilsen et al. |
| 6,127,020 A | 10/2000 | Bacon, Jr. et al. |
| 6,132,861 A | 10/2000 | Kang et al. |
| 6,157,486 A | 12/2000 | Benson, Jr. et al. |
| 6,172,810 B1 | 1/2001 | Fleming et al. |
| 6,174,607 B1 | 1/2001 | Sugita et al. |
| 6,191,200 B1 | 2/2001 | Phillips |
| 6,224,219 B1 | 5/2001 | Fleming et al. |
| 6,243,201 B1 | 6/2001 | Fleming et al. |
| 6,258,443 B1 | 7/2001 | Nilsen et al. |
| 6,258,918 B1 | 7/2001 | Ho et al. |
| 6,265,061 B1 | 7/2001 | Kang et al. |
| 6,274,221 B2 | 8/2001 | Smith et al. |
| 6,303,058 B1 | 10/2001 | Kelley et al. |
| 6,350,035 B1 | 2/2002 | Smith et al. |
| 6,386,699 B1 | 5/2002 | Ylitalo et al. |
| 6,423,418 B1 | 7/2002 | Callicott et al. |
| 6,503,564 B1 | 1/2003 | Fleming et al. |
| 6,506,480 B2 | 1/2003 | Liu et al. |
| 6,534,128 B1 | 3/2003 | Carlson et al. |
| 6,534,158 B2 | 3/2003 | Huang et al. |
| 6,541,591 B2 | 4/2003 | Olson et al. |
| 6,582,759 B1 | 6/2003 | Qiu et al. |
| 6,590,711 B1 | 7/2003 | Gardner et al. |
| 6,632,508 B1 | 10/2003 | Pellerite et al. |
| 6,649,249 B1 | 11/2003 | Engle et al. |
| 6,660,389 B2 | 12/2003 | Liu et al. |
| 6,660,390 B2 | 12/2003 | Bacon, Jr. |
| 6,676,261 B2 | 1/2004 | Mullen et al. |
| 6,677,045 B1 | 1/2004 | Meisenburg et al. |
| 6,685,323 B1 | 2/2004 | Mimura et al. |
| 6,699,567 B2 | 3/2004 | Mullen et al. |
| 6,720,042 B2 | 4/2004 | Ylitalo et al. |
| 6,723,433 B2 | 4/2004 | Bacon, Jr. |
| 6,726,982 B2 | 4/2004 | Christian et al. |
| 6,734,227 B2 | 5/2004 | Jing et al. |
| 6,789,905 B2 | 9/2004 | Hall et al. |
| 6,802,616 B2 | 10/2004 | Mimura |
| 6,815,040 B2 | 11/2004 | Pellerite et al. |
| 6,815,043 B2 | 11/2004 | Fleming et al. |
| 6,817,724 B2 | 11/2004 | Mimura et al. |
| 6,953,624 B2 | 10/2005 | Bacon, Jr. |
| 7,048,989 B2 | 5/2006 | Watkins et al. |
| 7,156,528 B2 | 1/2007 | Weiss et al. |
| 7,168,815 B2 | 1/2007 | Shipman et al. |
| 7,185,993 B2 | 3/2007 | Smith et al. |
| 2002/0094417 A1 | 7/2002 | Phillips |
| 2003/0084113 A1 | 5/2003 | Torii |
| 2003/0134949 A1 | 7/2003 | Brown |
| 2003/0144375 A1 | 7/2003 | Wu et al. |
| 2003/0170426 A1 | 9/2003 | Thielman |
| 2003/0198814 A1 | 10/2003 | Khieu et al. |
| 2003/0203186 A1 | 10/2003 | Jing et al. |
| 2003/0211299 A1 | 11/2003 | Rajan et al. |
| 2003/0235678 A1 | 12/2003 | Graham et al. |
| 2004/0006152 A1 | 1/2004 | Weikard et al. |
| 2004/0019142 A1 | 1/2004 | Rink et al. |
| 2004/0029044 A1 | 2/2004 | Severance et al. |
| 2005/0141243 A1 | 6/2005 | Mullen et al. |
| 2006/0158736 A1* | 7/2006 | Bacon ........................ 359/530 |
| 2007/0014011 A1 | 1/2007 | Smith et al. |

FOREIGN PATENT DOCUMENTS

| | | |
|---|---|---|
| JP | 3-292375 | 12/1991 |
| JP | 8-309929 | 11/1996 |
| JP | 9-302031 | 11/1997 |
| JP | 2003-084113 A | 3/2003 |
| JP | 2004-036161 A | 2/2004 |
| KR | 2006-0002637 | 1/2006 |
| WO | WO 97/31357 | 8/1997 |
| WO | WO 99/57185 | 11/1999 |
| WO | WO 01/23451 A2 | 4/2001 |
| WO | WO 02/31058 A1 | 4/2002 |
| WO | WO 2004/008192 A1 | 1/2004 |

OTHER PUBLICATIONS

"CIE 54.2 Retroreflection: Definition and Measurement", International Commission on Illumination, Published 2001, 62 pages.

* cited by examiner

PRISMATIC RETROREFLECTIVE ARTICLE WITH CROSS-LINKED IMAGE LAYER AND METHOD OF MAKING SAME

BACKGROUND

The present disclosure relates to prismatic retroreflective articles, and particularly, prismatic retroreflective articles having an image layer.

Retroreflective articles can be used to provide conspicuity to a variety of rigid and flexible materials. Some retroreflective articles can provide daytime and nighttime visibility to the materials to which they are applied for enhanced conspicuity under any lighting condition. For example, some retroreflective articles can include a color and/or graphic that is visible at least under daytime lighting conditions. In addition to improving daytime visibility, such colors and/or graphics can also be used to customize the retroreflective article and the material to which the retroreflective article is applied. For example, colored or graphic retroreflective articles can identify the source of a good or service, can include a text graphic with informational or advisory language, or can deliver a desired visual effect.

SUMMARY

Some embodiments of the present disclosure provide a prismatic retroreflective article including a transparent polymeric body portion having an elastic modulus less than $13 \times 10^8$ Pa (1.3 GPa), an optical layer coupled to the body portion and comprising internally reflecting cube-corner optical elements, and an image layer coupled to the body portion opposite the optical layer. The optical layer can have an elastic modulus greater than $14 \times 10^8$ Pa (1.4 GPa). The image layer can define an image having imaged portions and non-imaged portions, such that the image layer forms an exterior layer of the prismatic retroreflective article in the imaged portions. The image layer can include cross-links formed between a polymer resin having hydroxyl functional groups and a cross-linking agent having isocyanate functional groups. The polymer resin can include at least one of a polyester and a vinyl copolymer.

In some embodiments of the present disclosure, a method of making a prismatic retroreflective article is provided. The method can include providing retroreflective sheeting. The retroreflective sheeting can include a body portion having an elastic modulus of less than $13 \times 10^8$ Pa, and an optical layer coupled to the body portion and comprising internally reflecting cube-corner optical elements. The optical layer can have an elastic modulus of greater than $14 \times 10^8$ Pa. The method can further include printing or coating an image layer onto to the body portion of the retroreflective sheeting opposite the optical layer. The image layer can include a polymer resin and a cross-linking agent. The polymer resin can include at least one of a polyester having hydroxyl functional groups and a vinyl copolymer having hydroxyl functional groups, and the cross-linking agent can have isocyanate functional groups. The method can further include cross-linking the image layer to form cross-links between the hydroxyl functional groups of the polymer resin and the isocyanate functional groups of the cross-linking agent.

Some embodiments of the present disclosure provide a prismatic retroreflective article including a transparent polymeric body portion having an elastic modulus less than $13 \times 10^8$ Pa (1.3 GPa), an optical layer comprising internally reflecting cube-corner optical elements and being coupled to the body portion, and an image layer coupled to the body portion opposite the optical layer. The optical layer can have an elastic modulus greater than $14 \times 10^8$ Pa (1.4 GPa). The image layer can have a percent elongation of at least 80 percent and less than 200 percent. The image layer can include cross-links formed between a polymer resin having hydroxyl functional groups and a cross-linking agent having isocyanate functional groups. The polymer resin can include at least one of a polyester and a vinyl copolymer.

Other features and aspects of the disclosure will become apparent by consideration of the detailed description and accompanying drawings.

DETAILED DESCRIPTION

Figure 1:
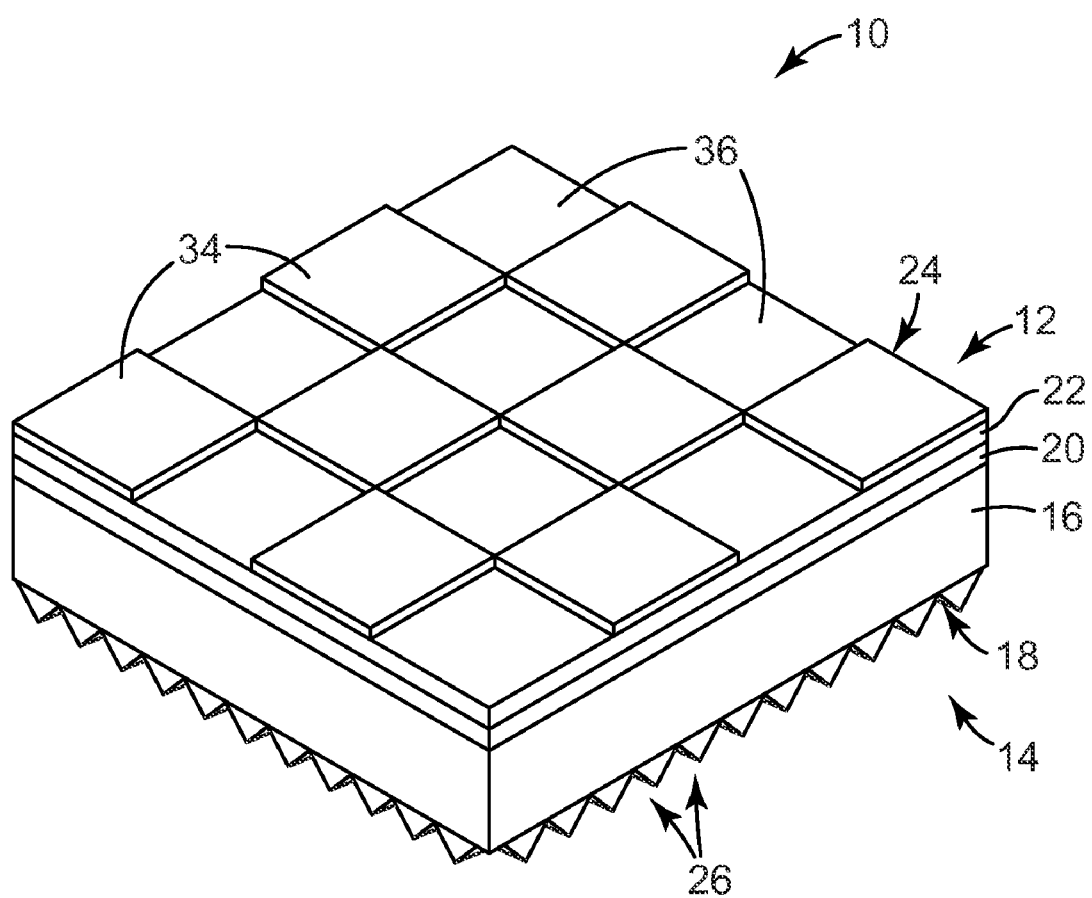
FIG. 1 is a schematic perspective view of a prismatic retroreflective article according to one embodiment of the present disclosure.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "applied," and "coupled" and variations thereof are used broadly and encompass both direct and indirect applications and couplings. Further, "applied" and "coupled" are not restricted to physical or mechanical connections or couplings. In some exemplary implementations, these terms may include any one or more of the following: physical, mechanical and optical connections, applications, or couplings. It is to be understood that other embodiments may be utilized, and structural or logical changes may be made without departing from the scope of the present disclosure. Furthermore, terms such as "front," "rear," "top," "bottom," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

Flexible retroreflective articles are sometimes folded and stored in a compact manner for use on demand. In some cases, the retroreflective articles are stored in environments of elevated temperatures (e.g., the trunk of a vehicle in mid-summer sun may be at least about 140° F. (60° C.), and may reach about 180° F. (82° C.)). At these elevated temperatures, the flexible materials (e.g., polyvinyl chloride (PVC)) making up one or more of the layers of the retroreflective article can begin to soften with potential plasticizer migration and staining issues. If inks are present on the surface of such a flexible layer, the inks may soften and block to themselves, to other layers of the retroreflective article, or may lose integrity of film-forming properties (e.g. due to plasticizer migration).

Some flexible retroreflective articles are over-coated with a barrier layer (e.g., a polyurethane layer) to reduce stain migration from fluorescent dyes, chemicals and oily contaminants. While compatible inks can be printed upon such barrier layers with good initial adhesion, ink performance and durability can begin to diminish at elevated temperatures or in other harsh environmental conditions.

In addition, some flexible retroreflective articles are used in apparel applications and need to be able to withstand the temperatures, pH and abrasion present in various laundering techniques.

As a result, a material (e.g., an ink composition) that can be used to deliver a desired (e.g., customized) visual effect to a retroreflective article (with or without a barrier layer) that is flexible and durable enough to withstand some of the harsh environmental conditions to which it may be exposed would be desirable.

The present disclosure is generally directed to a customized prismatic retroreflective article that exhibits a synergistic combination of flexibility and durability, while exhibiting the desired visual effects. The present disclosure is also directed to methods of making a flexible and durable customized prismatic retroreflective article.

A "retroreflective" article reflects incident incoming light in a direction generally parallel to the incident direction, or nearly so, such that an observer or detector at or near the light source can see or detect the reflected light. The word "light" refers generally to visible radiation in the electromagnetic spectrum.

The term "prismatic," when used with respect to retroreflective articles, generally refers to an array of cube-corner optical elements. "Cube-corner optical elements" include generally trihedral structures that have three approximately mutually perpendicular lateral faces meeting in a single corner (i.e., a cube-corner) to retroreflect incoming light. A "prismatic retroreflective article" generally includes a structured rear surface (i.e., a surface opposite the surface through which incoming light is directed) that includes a plurality of geometric structures, some or all of which include three reflective faces configured as a cube-corner optical element.

The word "polymer" includes homopolymers and copolymers. The term "copolymer" includes both random and block polymers.

The term "printing" is used to refer broadly to a variety of printing methods, including, but not limited to, gravure, offset, flexographic, lithographic, electrographic, electrophotographic (including laser printing and xerography), ion deposition (also referred to as electron beam imaging (EBI)), magnetographics, inkjet printing, dye sublimation printing, screen printing, and combinations thereof.

The term "coating" is used to refer broadly to a variety of coating methods, including, but not limited to, notch bar coating, wire bar coating, spray coating, brushing, controlled orifice die coating, and combinations thereof.

The term "transparent" is used according to its ordinary meaning. In some embodiments, it is used to refer to a material or layer that is able to transmit at least about 50 percent of the intensity of the light incident upon it at a given wavelength, measured along a normal axis. In some embodiments, the polymers that are used in the retroreflective sheeting of the present disclosure have a light transmissibility of greater than about 70 percent, in some embodiments, greater than about 80 percent, and in some embodiments, greater than about 90 percent.

The phrase "internally reflecting," when used with respect to a cube-corner optical element, is used broadly herein to refer to an element that reflects incident light back through the element either due to an air interface on the cube-corner element rear surface, or due to a reflective coating (e.g., a metallized coating, a coating containing a reflective pigment or a stack of coating layers having a refractive index mismatch) on the cube-corner element rear surface.

The phrases "stain-resistant" and "stain resistance" refer to the physical property wherein an article passes the stain resistance test described in the Examples section. Particularly, an article is stain-resistant if it exhibits an x,y shift of less than about 0.05 at 1 atmosphere (atm) pressure and elevated temperatures of up to about 40° C., and particularly, up to about 60° C. In some embodiments, an article is particularly stain-resistant if it exhibits an x,y shift of less than about 0.03 under these conditions.

The phrase "anti-block" refers to the physical property wherein an article passes one or both of the blocking tests described in the examples.

The phrases "washably durable" and "wash durability" refer to the physical property wherein an article passes one or both of the wash durability tests described in the examples. This is also sometimes described as "wash resistant."

The phrases "chemical resistant" and "chemical resistance" refer to the physical property wherein an article passes one or both of the chemical resistance tests described in the examples. Particularly, in some embodiments, "chemical resistant" can refer to an article that is resistant (i.e., according to the tests described in the examples) to one or more of the following solvents: mineral spirits, kerosene, unleaded gasoline, methanol, and VM&P naphtha, or a combination thereof.

FIG. 1 illustrates a prismatic retroreflective article (also sometimes referred to as "retroreflective sheeting") 10 having a front 12 and a rear 14, each layer making up the prismatic retroreflective article 10 having a respective front surface and rear surface. The prismatic retroreflective article 10 includes a transparent body portion 16, an optical layer 18 coupled to the rear surface of the body portion 16, a bonding layer 20 coupled to the front surface of the body portion 16, a barrier layer 22 coupled to the front surface of the bonding layer 20, and an image layer 24 coupled to the front surface of the barrier layer 22.

The barrier layer 22 and the bonding layer 20 are optional layers in the retroreflective article 10. In some embodiments, the image layer 24 is applied directly to the body portion 16 opposite the optical layer 18. In some embodiments employing the barrier layer 22, the barrier layer 22 is coupled directly to the body portion 16 without the use of the bonding layer 20.

The polymeric materials that compose the retroreflective article 10 are light transmissible, and in some cases, transparent. The coefficient of retroreflection ($R_A$), or retroreflectivity, of the retroreflective article 10 can vary depending on the desired properties of the finished article. In some embodiments, the coefficient of retroreflection of the retroreflective article 10 is sufficient to pass the ANSI/ISEA 107-2004 standard and the EN471 specification at 0 degrees and 90 degrees orientation angles. In some embodiments, the coefficient of retroreflection ranges from about 5 candelas per lux per square meter ($cd/(lux \cdot m^2)$), for colored retroreflective layers, to about 1500 $cd/(lux \cdot m^2)$, when measured at 0.2 degree observation angle and +5 degree entrance angle according to ASTM E-810 test method or CIE 54.2; 2001 test method for coefficient of retroreflection of retroreflective sheeting. In some embodiments, the coefficient of retroreflection of the retroreflective article 10 is at least about 330 $cd/(lux \cdot m^2)$, in some embodiments, at least about 500 $cd/(lux \cdot m^2)$, and in some embodiments, at least about 700 $cd/(lux \cdot m^2)$, as measured according to ASTM E-810 test method or CIE 54.2; 2001 test method at 0.2 degree observation angle and +5 degree entrance angle.

The body portion 16 is formed of a flexible, transparent polymeric material having an elastic modulus of less than about 13×10⁸ Pa (1.3 GPa), in some embodiments, less than about 10×10⁸ Pa, in some embodiments, less than about 7×10⁸ Pa, in some embodiments, less than about 5×10⁸ Pa, and in some embodiments, less than about 3×10⁸ Pa. The body portion 16 generally functions to protect the retroreflective article 10 from environmental elements and/or to provide significant mechanical integrity to the retroreflective article 10.

A flexible body portion 16 allows the retroreflective article 10 to be used in a variety of applications that require a certain degree of flexibility and/or conformability, including, but not limited to, one or more of a trailer tarpaulin; a roll-up sign; high visibility apparel and clothing such as shirts, pants, caps, coveralls, and vests; temporary traffic signage and delineation; and marine applications, such as personal flotation devices and life rafts.

The body portion 16 can be formed of a variety of polymeric materials, including, but not limited to, one or more of fluorinated polymers, ethylene copolymers, ionomeric ethylene copolymers, low density polyethylenes, plasticized vinyl halide polymers such as plasticized poly(vinylchloride), polyethylene copolymers, aliphatic and aromatic polyurethanes, methyl methacrylate butyl methacrylate coplolymers, poly vinylbutyral, copolyesters, and combinations thereof.

Figure 2:
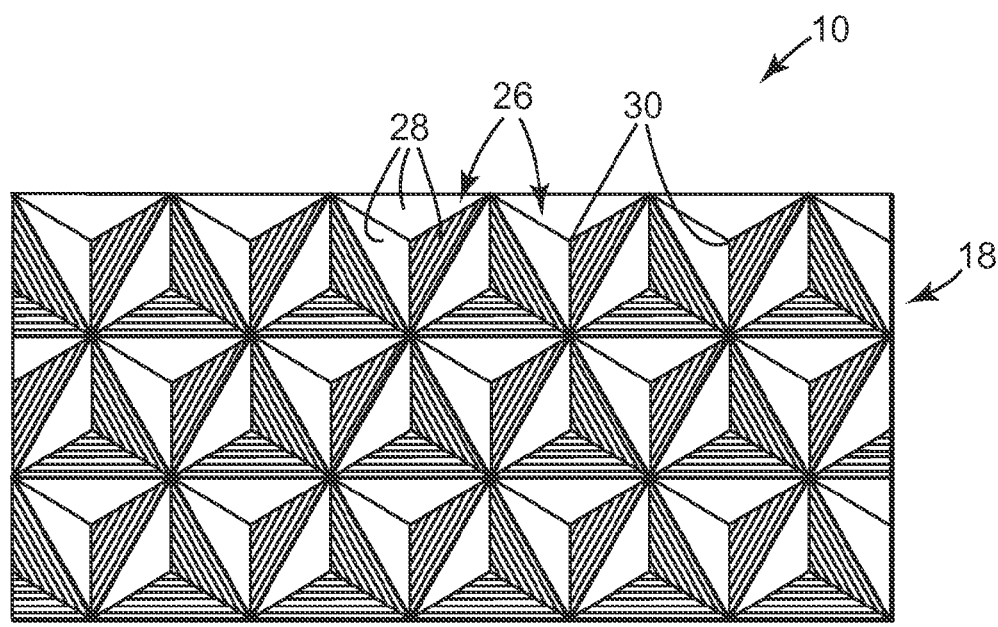
FIG. 2 is a plan view of the rear surface of the prismatic retroreflective article of FIG. 1.

As shown in FIG. 2, the optical layer 18 includes a structured rear surface formed of a plurality of cube-corner optical elements 26. Each cube-corner optical element 26 is defined by three open-air exposed planar facets 28 and an apex 30 arranged to form a trihedral pyramidal prism. The cube-corner optical elements 26 are disposed as matched pairs in an ordered array on one side of the retroreflective sheeting 10 (and are shown to protrude out of the page when viewed from the perspective of FIG. 2). The planar facets 28 may for example be substantially perpendicular to one another (as in the corner of a room). The angle between the facets 28 of adjacent cube corner optical elements can be substantially the same for each cube-corner element 26 in the array and is about 90°. The angle between adjacent cube corner optical elements 26 may however deviate from 90° as described, for example, in U.S. Pat. No. 4,775,219. Although the apex 30 of each cube-corner optical element 26 may be vertically aligned with the center of the cube-corner optical element base as described, for example, in U.S. Pat. No. 3,684,348, the apex 30 also may be canted as described, for example, in U.S. Pat. No. 4,588,258. Thus, the present disclosure is not limited to any particular cube-corner geometry, and any of the geometries now known or hereafter developed may be employed.

Figure 3:
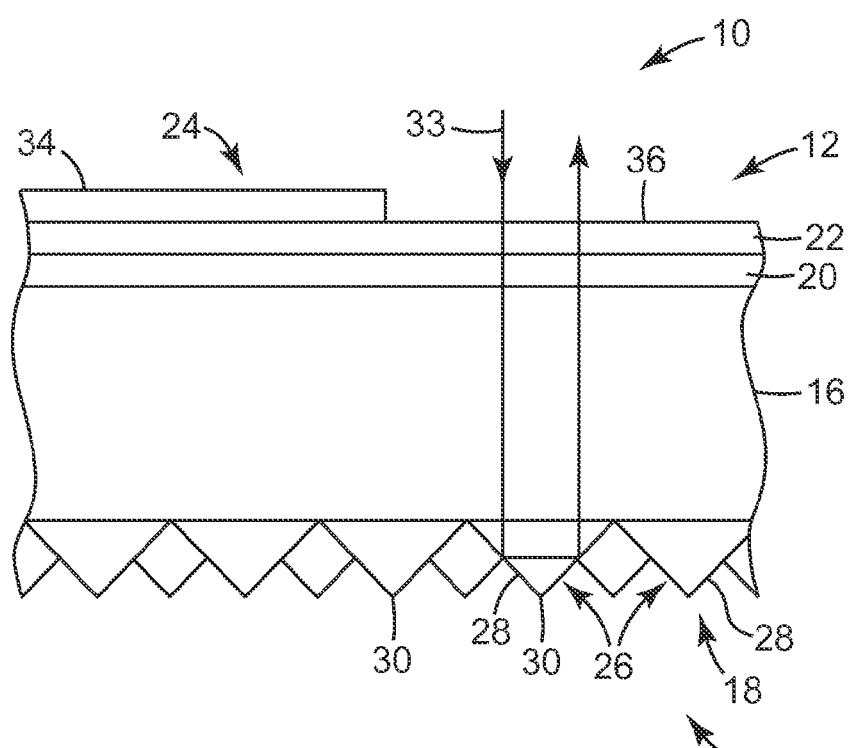
FIG. 3 is a partial side view of the prismatic retroreflective article of FIGS. 1-2, taken from the left side of FIG. 1.

In use, the retroreflective article 10 is arranged with its front 12 being disposed generally toward anticipated locations of intended observers and sources of incident light. As shown in FIG. 3, light enters the retroreflective article 10 through the front 12. The light then passes through the body portion 16 and strikes the planar facets 28 of the cube-corner optical elements 26 and returns in the direction generally parallel to (i.e., toward) that which it came, as shown by arrow 33, such that the cube-corner optical elements 26 are internally-reflecting. In embodiments where the retroreflective article 10 is likely to be exposed to moisture, the cube-corner optical elements 26 can be encapsulated with a seal film (not shown).

In some embodiments, the cube-corner optical elements 26 are formed of a transparent polymeric material having an elastic modulus of greater than about 14×10⁸ Pa, in some embodiments, greater than about 16×10⁸ Pa, in some embodiments, greater than about 18×10⁸ Pa, and in some embodiments, greater than about 20×10⁸ Pa. Thus, the cube-corner elements 26 can be formed of a polymeric material that has an elastic modulus that is at least about 1×10⁸ Pa greater than the polymeric material of the body portion 16, and may be at least about 5×10⁸, about 9×10⁸, about 11×10⁸, about 13×10⁸, or even about 17×10⁸ Pa greater than the polymeric material of the body portion 16.

The optical layer 18 can be formed of a variety of polymeric materials, including, but not limited to, one or more of acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), polyvinyl chloride, poly(vinylidene fluororide); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly (styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and combinations of the above polymers, such as a poly(ester) and poly(carbonate) blend, and a fluoropolymer and acrylic polymer blend, urethane acrylates, epoxy acrylates, and halogenated epoxy acrylates.

Additional materials suitable for forming the optical layer 18 are reactive resin systems capable of being cross-linked by a free radical polymerization mechanism by exposure to actinic radiation, such as electron beam, ultraviolet light, or visible light. Additionally, these materials may be polymerized by thermal means with the addition of a thermal initiator such as benzoyl peroxide. Radiation-initiated cationically polymerizable resins also may be used.

In some embodiments, the body portion 16 and the optical layer 18 are integrally formed of the same material into a cube-corner sheeting having a generally planar front surface and an array of cube corner optical elements 26 protruding from its rear surface. Such cube-corner sheeting can be formed by casting, thermal embossing, extrusion, injection molding, or a combination thereof. In some embodiments, as shown in FIGS. 1 and 3 and described above, the body portion 16 and the optical layer 18 are formed of different materials to achieve the desired level of flexibility without diminishing retroreflectivity. In such embodiments, by way of example only, the body portion 16 can be extruded, and the optical layer 18 can be cast and cured to the body portion 16.

In some applications, the retroreflective sheetings are used on flat inflexible articles, for example, road signs and barricades. However, in some applications, the sheetings are used on irregular or flexible surfaces. For example, a retroreflective sheeting may be adhered to the side of a truck trailer, which requires the sheeting to pass over corrugations and protruding rivets, or the sheeting may be adhered to a flexible substrate such as a road worker's safety vest. In situations where the underlying surface is irregular or flexible, the retroreflective sheeting can possesses good conformability and flexibility (e.g., by employing a relatively flexible body portion 16) but not at the expense of sacrificing retroreflective performance (e.g., by employing a relatively rigid optical layer 18 to maintain optical properties).

Whether integrally formed with the body portion 16 or formed separately, the optical layer 18 can include a multitude of rigid, interconnected, cube-corner optical elements (e.g., the optical layer 18 can include a land area), or the optical layer 18 can include a plurality of discrete or independent cube-corner optical elements 26, as shown in the embodiment illustrated in FIGS. 1-3. The term "discrete" as used with respect to cube-corner optical elements 26 refers to each element being detached or independent from an adjacent cube-corner optical element 26. The use of discrete cube-corner optical elements 26 can increase the flexibility of the retroreflective article 10 because each cube-corner optical element 26 can move independently of the other cube-corner optical elements 26. Discrete cube-corner optical elements 26, such as those shown in FIGS. 1-3, can be prepared, for example, by casting directly onto a film (e.g., the body portion 16), such as described in U.S. Pat. No. 5,691,846 incorporated herein by reference.

Retroreflective articles employing a body portion formed of a low elastic modulus polymeric material and cube-corner elements formed of a higher elastic modulus polymeric material and methods of making such articles are described in greater detail in US Patent Application Publication No. 2007/0014011 and U.S. Pat. Nos. 7,185,993, 6,350,035, 5,988,820, 5,691,846, and 5,450,235, the disclosures of which are incorporated herein by reference.

The barrier layer 22 can be employed in the retroreflective article 10 to provide a flexible, printable and stain resistant layer to the retroreflective article 10. As described below, this may be especially useful in embodiments employing an image layer 24 that defines an image (such as in the embodiment illustrated in FIGS. 1-3), where the image layer 24 does not form an exterior (front) surface for the entire retroreflective article 10.

The barrier layer 22, if employed, can be formed of cross-linked polyurethane chemistries (e.g., polyurethanes and polyurethane acrylates), polyacrylates, or a combination thereof. Particularly, the barrier layer 22 can include a reaction product of a hard component, a soft component and a cross-linking agent. In some embodiments, the resulting cured barrier layer 22 has a percent elongation of at least about 150%, and in some embodiments, a percent elongation of at least about 200%.

The hard component and/or the soft component of the barrier layer 22 can include functional end groups or functional side chains such that the components can be reacted to form a cross-linked network. In some embodiments, the hard component can include at least one hydroxy functional thermoplastic polyurethane, acrylic polymer, polymeric polyol or mixture thereof and can have a percent elongation of up to about 150%. In some embodiments, the soft component can include at least one hydroxy functional thermoplastic polyurethane, non-reactive polyurethane, polymeric polyol, or mixture thereof and can include a percent elongation of at least about 200%, and particularly, ranging from about 200% to about 800% after cross-linking. In some embodiments, the cross-linking agent is a diisocyanate or a polyisocyanate.

As shown in FIGS. 1 and 3, the bonding layer 20 is coupled to the front surface of the body portion 16, such that the bonding layer 20 is positioned between the body portion 16 and the barrier layer 22. The bonding layer 20, when employed, is chosen such that it does not diminish the flexibility, printability and stain resistance of the barrier layer 22, but rather improves the adhesion between the barrier layer 22 and the body portion 16. The bonding layer 20 can be formed of a variety of materials, including, but not limited to, thermoplastic polyurethanes and/or a pressure sensitive adhesive material. Examples of suitable pressure sensitive adhesive materials include, but are not limited to, acrylics, polyesters, rubbers, or a combination thereof.

In some embodiments, the barrier layer 22 and/or the bonding layer 20 can include one or more additives to impart properties such as coating uniformity, conspicuity, aesthetics, release properties, outdoor weatherability, or a combination thereof. Examples of suitable additives can include, but are not limited to, surfactants, flow control agents, wetting agents, colorants (e.g., pigments and/or dyes), ultraviolet (UV) stabilizers, hindered amine light stabilizers (HALS), or a combination thereof.

In some embodiments, the barrier layer 22 and/or the bonding layer 20 are coated, transfer laminated, (co-)extruded, or a combination thereof, onto the body portion 16. In some embodiments, the barrier layer 22 and the bonding layer 20 are pre-coated together onto a liner to improve handling and to allow for subsequent storage and lamination to the body portion 16. The cured coating layer or film, comprised of the barrier layer 22 and optional bonding layer 20, is transparent.

In some embodiments, the bonding layer 20 is not provided as a separate layer, but rather is incorporated into the barrier layer 22 by admixing a bonding layer composition, or major component thereof, with the barrier layer composition.

The formulations and methods of making such a barrier layer (also sometimes referred to as an "SR layer" for its stain-resistant properties) and a bonding layer are described in greater detail in U.S. Pat. Nos. 6,660,390, 6,723,433, and 6,953,624, the disclosures of which are incorporated herein by reference.

The image layer 24 can be formed to include a variety of graphic images. For example, the image layer 24 of the embodiment illustrated in FIGS. 1 and 3 is in the form of a checkerboard pattern. In some embodiments, the image layer 24 defines an image which can be formed by a variety of methods, including printing and coating methods. The image can be colored and can include imaged portions 34 and non-imaged portions 36. In such embodiments, as shown in FIGS. 1 and 3, the image layer 24 forms an outermost exterior (front) layer of the retroreflective article 10 in the area of the imaged portions 34, whereas another layer can form an exterior layer of the retroreflective article 10 in the area of the non-imaged portions 36. In the embodiment illustrated in FIGS. 1-3, the barrier layer 22 forms an exterior layer of the retroreflective article 10 in the area of the non-imaged portions 36. The arrangement of the image layer 24 and the optional barrier layer 22 allows a user to customize the retroreflective article 10 in any way desired.

In some embodiments, as shown in the embodiment illustrated in FIGS. 1-3, the image layer 24 can define a colored image bearing a desired graphic or pattern and having imaged portions 34 and non-imaged portions 36. Such an image can customize the retroreflective article 10 to be specific to a particular supplier or application. In some embodiments, the image layer 24 can include a continuous layer that includes only imaged portions. Such a continuous layer can also function to customize the retroreflective article 10, and can enhance the visual effect of the retroreflective article 10 in a variety of ways, such as by adding gloss (i.e., a clear coat) and/or by adding color (i.e., a flood color).

The image layer 24 can be formed of a light-transmissible cross-linked polymeric material, and in some cases, a transparent cross-linked polymeric material. In some embodiments, the image layer 24 is colored and can include a color that depending on the wavelength bandpass transmits at least about 5% for darker colors such as dark browns and dark blues, and at least about 20%, about 50%, and about 70% with lighter colors such as golds and yellows.

In some embodiments, the image layer 24 can be formed by combining a film-forming polymer resin (i.e., a polymer that includes two or more of the same or a different repeating chemical unit and which forms a substantially continuous layer upon drying) and a cross-linking agent to form a cross-linked polymeric layer (e.g., after drying). For example, the image layer 24 can be formed by combining a film-forming polymer resin having available hydroxyl functional groups with a cross-linking agent having available isocyanate functional groups. The polymer resin can include a polyester (e.g., as supplied by NAZDAR® 9600 Series Polyester Screen Ink, available from Nazdar, Shawnee, Kans.), a vinyl copolymer, or a combination thereof.

Examples of suitable vinyl copolymer resins include, but are not limited to, a resin comprising vinyl copolymers and alkyd (e.g., as supplied by 3M™ SCOTCHLITE™ Process Color Series 990, available from 3M Company, St. Paul, Minn.), a resin comprising vinyl copolymers and acrylic (e.g., as supplied by 3M™ SCOTCHLITE™ Transparent Screen Printing Ink Series 2900, available from 3M Company, St. Paul, Minn.), and combinations thereof.

In some embodiments, the image layer 24 is at least partially formed of an ink that includes the desired polymer resin and a colorant (e.g., a dye or pigment) dispersed in the polymer resin. In some embodiments, the image layer 24 is at least partially formed of a clear ink that includes the desired polymer resin without any colorant.

Examples of suitable cross-linking agents include, but are not limited to, aliphatic isocyanates (e.g., hexamethylene diisocyanate, isophorone diisocyanate (IPDI)), aliphatic polyfunctional isocyanates (e.g., 1,6-hexamethylene diisocyanate (HDI), 1,4-tetramethylene diisocyanate, 1,12-dodecane diisocyanate, 1,6-diisocyanato-2,2,4,4,-tetramethylhexane, 1,6-diisocyanato-2,4,4-trimethylhexane), cycloaliphatic polyfunctional isocyanates (e.g., dicyclohexylmethane-4,4'-diisocyanate, cyclohexane-1,4-diisocyanate, cyclobutane-1,3-diisocyanate, 1-isocyanato-3,3,5-trimethyl-5-isocyanatomethycyclohexane), and combinations thereof.

In some embodiments employing polyfunctional isocyanates, the functionality can be at least 2, and in some embodiments, no more than 4. A greater number of isocyanate functionalities can reduce flexibility of the resulting image layer 24. Aromatic isocyanates (e.g., toluene diisocyanate (TDI), diphenylmethane-4,4'-diisocyanate (MDI)) can be used but are generally not recommended due to their reduced weatherability.

In some embodiments, the cross-linking agent includes about 50% to about 100% solids, depending the mixing equipment to be used. In some embodiments, the image layer 24 includes an ink system, which can include the polymer resin as well as other additives, colorants and/or solvents. In some embodiments, the ink system can include about 25% to about 50% solids to allow for mixing and modification for formation of a clear coat or color blending.

In some embodiments, the image layer 24 includes at least about 3% cross-linking agent solids to image layer solids, in some embodiments, at least about 8%, and in some embodiments, at least about 12%. In some embodiments, the image layer 24 includes no more than about 45% cross-linking agent solids to image layer solids, in some embodiments, no more than about 35%, and in some embodiments, no more than about 30%. In some embodiments, the cross-linking agent solids range from about 75% to about 80% solids, and the image layer solids range from about 25% to about 50% solids, and the cross-linking agent is present in an amount ranging from about 15% to about 30% cross-linking agent solids to image layer solids.

In some embodiments in which the image layer is at least partially formed from an ink system, the cross-linking agent is added in an amount of at least about 2 parts cross-linking agent to 100 parts ink system. In some embodiments, the cross-linking agent is added in an amount of at least about 5 parts cross-linking agent to 100 parts ink system, and in some embodiments, at least about 8 parts cross-linking agent to 100 parts ink system. In some embodiments, the cross-linking agent is added in an amount of no more than about 15 parts cross-linking agent per 100 parts ink system, in some embodiments, no more than about 12 parts cross-linking agent per 100 parts ink system, and in some embodiments, no more than about 10 parts cross-linking agent per 100 parts ink system.

Excess cross-linking agent can be undesirable. For example, excess unreacted isocyanate after moisture curing can lead to reduced flexibility.

The appropriate level of cross-linking of the image layer 24 can vary, depending on the materials used to form the image layer 24 and the desired application of the retroreflective article 10. In some embodiments, the image layer 24 is cross-linked to a level such that the image layer 24 has a percent elongation of at least about 80%, in some embodiments, at least about 100%, and in some embodiments, at least about 125%. In some embodiments, the image layer 24 is cross-linked to a level such that the image layer 24 has a percent elongation of less than about 200%, in some embodiments, less than about 175%, and in some embodiments, less than about 150%.

The thickness of the image layer 24 can vary, depending on the desired application and visual effect. In some embodiments, the image layer 24 has a thickness of at least about 0.05 thousandths of an inch ("mil"), in some embodiments, at least about 0.1 mil, and in some embodiments, at least about 0.2 mil. In some embodiments, the image layer 24 has a thickness of less than about 5 mil, in some embodiments, less than about 2 mil, and in some embodiments, less than about 1 mil.

In some embodiments, the image layer 24 can include one or more additives to impart properties such as coating uniformity, conspicuity, aesthetics, release properties, outdoor weatherability, or a combination thereof. Examples of suitable additives can include, but are not limited to, surfactants, flow control agents, wetting agents, colorants (e.g., pigments and/or dyes), ultraviolet (UV) stabilizers, hindered amine light stabilizers (HALS), or a combination thereof.

As mentioned above, in some embodiments, the image layer 24 forms at least a portion of an outermost exterior layer of the retroreflective article 10. As a result, an image layer 24 that is able to withstand a variety of environmental conditions can also be particularly useful. The general ability to withstand a desired set of environmental conditions will generally be described herein as being "durable." Such environmental conditions can include, but are not limited to, exposure to high temperatures (and in some cases, combined with high pressures), exposure to abrasives or abrasive materials, exposure to harsh chemicals (e.g., low pH environments, solvents, gasoline, etc.), and combinations thereof. Accordingly, the image layer 24 can be particularly useful in a variety of applications if the image layer 24 has one or more of the following properties: wash-durability, heat-resistance (such as one or both of anti-block and stain-resistance), abrasion resistance, chemical resistance, and a combination thereof.

Such durability can allow the image layer 24 to also function as a protective layer for the retroreflective article 10 (particularly in embodiments in which the image layer 24 is a continuous layer) to reduce migration of stains (e.g., from florescent dyes in underlying layers, such as the body portion 16), chemicals (e.g., plasticizers in an underlying layer), and/or oily contaminants from any of the underlying layers to the exterior exposed front 12 of the retroreflective article 10.

For example, the body portion 16 can be formed of a plasticized polyvinyl chloride (PVC) or other material comprising unreacted monomeric or polymeric plasticizers. Plasticizers and colorants soluble in the plasticizers tend to migrate over time in order to reach an equilibrium concentration at the interface between the body portion 16 and a contacting layer or substrate. Internal migration or staining can be evident by the presence of oil or stain on the exposed surface of the body portion 16. Internal migration or staining can also be detected by the eventual staining of absorbent material, such as paper, in contact with the exposed surface. Other external staining can occur when plasticized PVC is contacted with other soluble dyes contained in color layers, colored substrates, and fabric dye colorants found in laundered fabrics. In general, both internal and external staining tendencies worsen with increased temperature. In some embodiments, the image layer 24 can resist staining at room temperature (i.e., about 25° C.). In some embodiments, the image layer 24 can resist external and internal staining at elevated temperatures, ranging up to about 40° C., and in some cases, up to about 60° C. In some embodiments, the image layer 24 has been found to resist staining caused from colored body portions 16 (e.g., a PVC body portion comprising a fluorescent yellow dye), as well as bleeding fabric dyes at temperatures ranging from room temperature to about 60° C.

As a protective layer, the image layer 24 can be used in combination with other decorative layers that may not necessarily have the same durability properties as the image layer 24. For example, an additional ink layer can be printed onto the retroreflective article (e.g., directly onto the body portion 16) to define a graphic image or pattern, and the image layer 24 can be applied over the ink layer as a protective and durable layer, such that the image layer 24 and the ink layer together provide a durable and flexible retroreflective article that exhibits a desired visual effect.

While durability of the image layer 24 is important, the retroreflective article 10 is also particularly useful in a variety of applications if it maintains a desired amount of flexibility and comformability. As a result, the retroreflective article 10 of the present disclosure is a synergistic combination of durability and flexibility, while also exhibiting the desired visual effects. Thus, the image layer 24 is cross-linked to an optimal level that will achieve the desired durability, while maintaining the desired flexibility to make the image layer 24 suitable to applications that may include irregular and/or flexible surfaces.

As mentioned above, embodiments employing the barrier layer 22 can present a host of problems in customizing the retroreflective article 10, because inks that are compatible with the barrier layer 22 and that may exhibit good initial adhesion to the barrier layer 22 may not necessarily withstand harsh environmental conditions (e.g., that the barrier layer 22 may be able to withstand). However, the image layer 24 of the present disclosure can be cross-linked to be durable and to avoid diminishing the durability that is achieved by the barrier layer 22.

The image layer 24 can be formed by being applied (e.g., by printing or coating) to the body portion 16 of the retroreflective sheeting 10 opposite the optical layer 18. The image layer 24 can be applied directly to the front surface of the body portion 16, or the image layer 24 can be applied to another additional layer, such as one or more of the barrier layer 22 and the bonding layer 20. As mentioned above, the image layer 24 can form an image having imaged portions 34 and non-imaged portions 36, or the image layer 24 can be one continuous layer. After the image layer 24 has been applied directly or indirectly onto the body portion 16, the image layer 24 is cross-linked to form cross-links between the hydroxyl functional groups of the polymer resin and the isocyanate functional groups of the cross-linking agent.

Cross-linking the image layer 24 can include chemically cross-linking the image layer 24 and/or cross-linking the image layer 24 by radiation. Examples of suitable chemical cross-linking techniques include, but are not limited to, reacting the mixture at room temperature, heating the image layer 24 to above room temperature, drying the image layer 24, or a combination thereof. Examples of heating the image layer 24 to above room temperature include heating the image layer 24 (e.g., in an oven) to a temperature of at least about 50° C., at least about 60° C., or at least about 70° C. for a time of at least about 90 seconds, at least about 5 minutes, or at least about 10 minutes. Examples of suitable types of radiation include, but are not limited to, various forms of actinic radiation (e.g., UV radiation, visible light radiation, X-ray radiation, infrared radiation), and electron beam radiation.

The following working examples are intended to be illustrative of the present disclosure and not limiting.

EXAMPLES

Table 1 lists the abbreviation, generic description, trade designation, supplier and supplier location for ingredients and materials employed in the Examples. In general, only the primary or active ingredients are specified in the 'Generic Description' column of Table 1, but one of ordinary skill in the art will understand that some of the ingredients or materials may include additional additives or solvents that are not specified in Table 1.

TABLE 1

| Abbreviation | Generic Description | Trade Designation | Supplier (Location) |
|---|---|---|---|
| 990-12 | Ink comprising an organic red pigment dispersed in a polymer resin formed of a vinyl copolymer having hydroxyl functional groups (i.e., vinyl acetate-vinyl alcohol-vinyl chloride copolymer) and an alkyd resin | 3M ™ SCOTCHLITE ™ Process Color Series 990; 990-12 | 3M Company (St. Paul, MN) |
| 990-5 | Ink comprising a carbon black pigment dispersed in a polymer resin formed of a vinyl copolymer having hydroxyl functional groups (i.e., vinyl acetate-vinyl alcohol-vinyl chloride copolymer) and an alkyd resin | 3M ™ SCOTCHLITE ™ Process Color Series 990; 990-5 | 3M Company (St. Paul, MN) |
| 2905 | Ink comprising a carbon black pigment dispersed in a polymer resin formed of a vinyl copolymer having hydroxyl functional groups (i.e., vinyl acetate-vinyl alcohol-vinyl chloride | 3M ™ SCOTCHLITE ™ Transparent Screen Printing Ink Series 2900; 2905 | 3M Company (St. Paul, MN) |

TABLE 1-continued

| Abbreviation | Generic Description | Trade Designation | Supplier (Location) |
|---|---|---|---|
| | copolymer) and an acrylic resin | | |
| 2913 | Ink comprising a maroon pigment dispersed in a polymer resin formed of a vinyl copolymer having hydroxyl functional groups (i.e., vinyl acetate-vinyl alcohol-vinyl chloride copolymer) and an acrylic resin | 3M ™ SCOTCHLITE ™ Transparent Screen Printing Ink Series 2900; 2913 | 3M Company (St. Paul, MN) |
| 2915 | Ink comprising a cyan pigment dispersed in a polymer resin formed of a vinyl copolymer having hydroxyl functional groups (i.e., vinyl acetate-vinyl alcohol-vinyl chloride copolymer) and an acrylic resin | 3M ™ SCOTCHLITE ™ Transparent Screen Printing Ink Series 2900; 2915 | 3M Company (St. Paul, MN) |
| 2920DR | Clear ink comprising a polymer resin formed of a vinyl copolymer having hydroxyl functional groups (i.e., vinyl acetate-vinyl alcohol-vinyl chloride copolymer) and an acrylic resin | 3M ™ SCOTCHLITE ™ Transparent Screen Printing Ink Series 2900; 2900DR | 3M Company (St. Paul, MN) |
| 9624 | Ink comprising a black pigment dispersed in a polyester resin having hydroxyl functional groups | NAZDAR ® 9600 Series Polyester Screen Ink; 9624 | Nazdar (Shawnee, KS) |
| 96PB22 | Ink comprising a blue pigment dispersed in a polyester resin having hydroxyl functional groups | NAZDAR ® 9600 Series Polyester Screen Ink; 96PB22 | Nazdar (Shawnee, KS) |
| 96PB60 | Ink comprising a red pigment dispersed in a polyester resin having hydroxyl functional groups | NAZDAR ® 9600 Series Polyester Screen Ink; 96PB60 | Nazdar (Shawnee, KS) |
| 9627 | Clear ink comprising polyester resin having hydroxyl functional groups | NAZDAR ® 9600 Series Polyester Screen Ink; 9627 | Nazdar (Shawnee, KS) |
| HDI-75 | 75% 1,6-hexamethylene diisocyanate in butyl acetate and xylene | Bayer N75BA/X | Bayer Polymers LLC (Pittsburgh, PA) |
| HDI-80 | Liquid formulation comprising 1,6-hexamethylene diisocyanate | NAZDAR ® NB80 | Nazdar (Shawnee, KS) |
| 9631 | gamma butyrol petroleum distillate | NAZDAR ® 9600 Series Retarder; 9631 | Nazdar (Shawnee, KS) |
| 9630 | petroleum distillate, cyclohexanone, gamma butyrolactone, naphthalene | NAZDAR ® 9600 Series Thinner; 9630 | Nazdar (Shawnee, KS) |
| CGS-50 | 2-butoxyethyl acetate | 3M ™ CGS-50 Thinner | 3M Company (St. Paul, MN) |
| PMA | propylene glycol monomethyl ether acetate | | |

Test Methods for Examples 1-8 and Comparative Examples A-G

Adhesion

The Adhesion tests were performed according to ASTM D3359. The image layer (i.e., whether cross-linked or not) of a retroreflective article was scored through in a cross hatch pattern with a sharp razor blade, the parallel and perpendicular scores being spaced apart at intervals of about ⅛" (3 mm). A 1"×6" piece (0.03 m×0.15 m) of tape commercially available from 3M (St. Paul, Minn.) under the trade designation "3M Filament Tape 898" was repeatedly contacted via a squeegee to the scored area of the image layer, quickly adhering a 1 square inch (6.45 cm²) portion followed by rapid removal at an orientation of 90 degrees relative to the surface of the image layer at a rate of about one repetition every 5 to 10 seconds. To "pass" the adhesion test, none of the image layer must be observed on the tape.

Stain-Resistance

A 2"×6" (0.05 m×0.15 m) laminate was formed by over-laminating clear PVC film to the image layer side of the retroreflective sheeting. The laminates were placed in a 140° F. (60° C.) oven for 48 hrs at 1 atm and the clear polyvinyl chloride (PVC) film was measured for color and gloss on standard white 20/50 lb. (9/22 kg) copy paper, commercially available from International Paper, Memphis, Tenn. under the trade designation "CopyPlus" both before being laminated to the retroreflective sheeting comprising the image layer (i.e., a 2"×6" (0.05 m×0.15 m) sample of the clear PVC film was tested alone), and after being laminated and heated as described above.

The color in these two states was measured using a calorimeter commercially available from Hunter Associate Laboratory Inc., Reston, Va. under the trade designation "Hunterlab Labscan II." The operating conditions for the "Hunterlab Labscan II" included a D65 illuminate and a 2 degree observation angle, recording the coordinate for CIE Y, x and y. CIE 1931 Chromaticity Diagram uses Cartesian coordinates to define a color in color space. (CIE=Commission Internationale d'Eclairage, the International Commission on Illumination) According to CIE 1931 Chromaticity Diagram, the x and y coordinates plot the color saturation and the hue. The change in color (i.e., the x,y color shift) in the clear PVC film was determined by calculating the distance between the coordinates of the sample before being laminated to the image layer side of the retroreflective sheeting and after being laminated and heated as described above. The x,y color shift of the clear PVC film was used to detect if any staining or plasticizer migration from the body portion of the retroreflective sheeting occurred. To pass the stain resistance test (and therefore to be "stain-resistant"), the clear PVC film must exhibit an x,y color shift of less than 0.05.

Blocking

Block testing of the image layer was performed by folding 4"×8" (0.10 m×0.20 m) samples of the retroreflective sheeting comprising the image layer, such that there were areas of image layer to image layer contact, as well as image layer to substrate (e.g., the body portion or the barrier layer, depending on the substrate used) contact. A 127 g/in$^2$ (1.97×10$^5$ g/m$^2$) weight was placed atop the folded samples and the samples were placed in an oven for 24 hours, first at 140° F. (60° C.; represented as "140° F. 24 h"), and then the same sample was placed in an oven for an additional 24 hours at 160° F. (71° C.; represented as "+160° F. 24 h"), and finally, the same sample was placed in an oven for an additional 24 hours at 180° F. (82° C.; represented as "+180° F. 24 h"). Each sample was observed after each 24-h cycle of the blocking test. To pass each 24-h cycle of the blocking test (i.e., to have "anti-block" properties), no image layer transfer can be observed (either image layer to image layer or image layer to substrate).

Chemical Resistance

Chemical resistance testing of the image layer was performed by saturating a cloth (e.g., KIMTECH SCIENCE KIMWIPES® 2-ply Delicate Task Wipers with LINT-GUARD® anti-stat polyshield, available from Kimberly-Clark Corporation, Dallas, Tex.) with a solvent of interest and rubbing the saturated cloth back and forth 20 times (i.e., 20 "double rubs") across the surface of the image layer. Each of the following solvents were tested: mineral spirits, kerosene, unleaded gasoline, methanol, and VM&P naphtha. To pass the chemical resistance test, the image layer needed to remain intact and exhibit no visible smearing (i.e., as determined by visual observation), following the 20 double rubs.

Wash Durability

The wash durability testing was performed according to the test method ISO 6330-2A. Wash cycles were 12 min. at 60° C. (with rinse and spin cycles as specified in ISO 6330-2A) using WASCATOR® washers (Model FOM71MP, Electrolux Laundry Systems Corporation, Copenhagen, Denmark). Dry cycles were performed every fifth wash cycle for 45 min. at 50° C. using UniDryer dryers (Model UDS-50, UniMac/Alliance Laundry Systems, Ripon, Wis.). The minimum ANSI/ISEA 107-2004 and EN 471 specification at 0 degrees and 90 degrees orientation angles, at a 0.2 degree observation angle and a +5 degree entrance angle is 330 cd/(lux·m$^2$). Gloss was measured at sixty degrees using a glossmeter (Micro-gloss Model No. 4502, BYK-Gardner, Columbia, Md.).

Examples 1-2 and Comparative Examples A-B

Mixed clear inks formed according to the formulations specified in Table 2 were propeller mixed in glass jars, vacuum de-aerated, and allowed to rest for 1 hr. Examples 1 and 2 included a cross-linking agent, which was added at an amount of 10 parts cross-linking agent to 100 parts ink system (and the ink included the polymer resin). The resulting mixed clear inks were coated using notch bar coating to a 0.001-inch thickness to the polyvinyl chloride (PVC) top film side of 3M™ SCOTCHLITE™ Reflective Material Series 6287 lime yellow retroreflective sheeting (available from 3M Company, St. Paul, Minn.) to form a continuous, clear image layer, and allowed to air dry at room temperature (i.e., about 25° C.) and atmospheric pressure (about 1 atm) for 48 hrs.

TABLE 2

| | | Example: | | | |
|---|---|---|---|---|---|
| | | | 1 | | 2 |
| | | Comp. Ex.: | | | |
| Ingredient | | A | | B | |
| 2920DR | Clear | 40 | 40 | | |
| HDI-75 | Isocyanate | | 4 | | |
| PMA | Solvent | 6 | 4 | | |
| 9627 | Clear | | | 40 | 40 |
| 9631 | Retarder | | | 4 | 4 |
| HDI-80 | Isocyanate | | | | 4 |
| Total | | 46 | 48 | 44 | 48 |

Each of Examples 1-2 and Comparative Examples A-B were tested according to the adhesion test and the blocking test. The results of the adhesion testing ("Adh"), the block testing ("Anti-block"), and the stain resistance testing are reported in Table 3. As shown in Table 3, only the cross-linked image layers (i.e., Examples 1-2) passed all of the adhesion test, the stain resistance test and the blocking test.

TABLE 3

| Example/ Comp. Ex. | X-link | Adh | Anti-block 140 F. 24 h. | Anti-block + 160 F. 24 h | Anti-block + 180 F. 24 h | Stain Resistance |
|---|---|---|---|---|---|---|
| A | No | Pass | Fail | Fail | Fail | Pass @ 0.007 |
| 1 | Yes | Pass | Pass | Pass | Pass | Pass @ 0.005 |

TABLE 3-continued

| Example/ Comp. Ex. | X-link | Adh | Anti-block 140 F. 24 h. | Anti-block + 160 F. 24 h | Anti-block + 180 F. 24 h | Stain Resistance |
|---|---|---|---|---|---|---|
| B | No | Pass | Pass | Fail | Fail | Fail @ 0.083 |
| 2 | Yes | Pass | Pass | Pass | Pass | Pass @ 0.023 |

Figure 4:
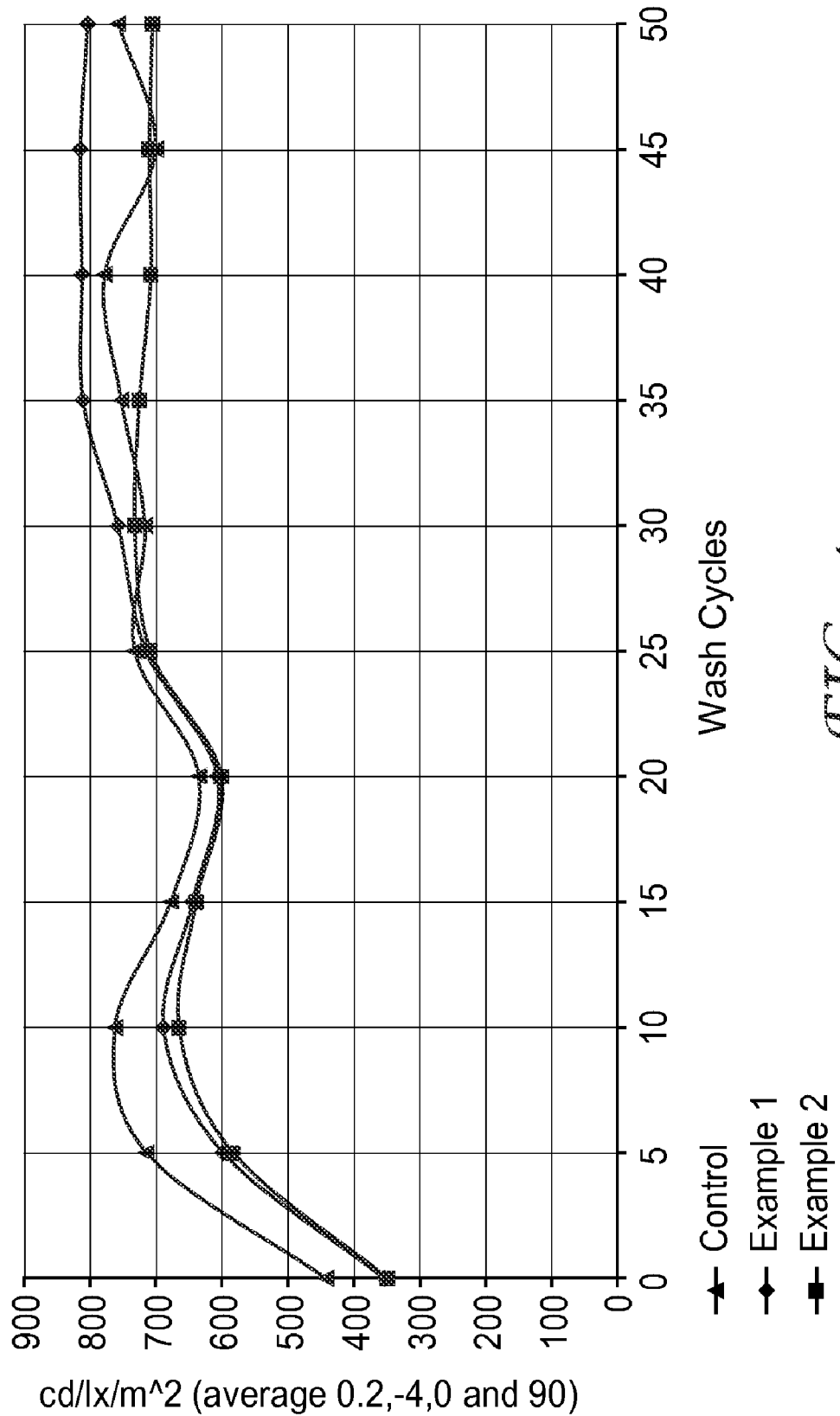
FIG. 4 illustrates retroreflectivity brightness retention of Examples 1 and 2, as compared to a control, after a number of wash cycles.

Only Examples 1 and 2 were further tested for wash durability (also sometimes referred to as "wash resistance"), in terms of brightness retention. The results of the wash durability testing (i.e., the coefficient of retroreflection ($R_A$) in cd/(lux·m$^2$)) are listed in Table 3A and displayed in FIG. 4. In Table 3A and FIG. 4, the brightness retention results for Examples 1 and 2 are shown as compared to the substrate alone (i.e., the 3M™ SCOTCHLITE™ Reflective Material Series 6287 lime yellow retroreflective sheeting alone), which is labeled "Control." As shown in FIG. 4, the image layers formed according to Examples 1 and 2 passed the minimum brightness, even after 50 washes.

TABLE 3A

| # of Wash Cycles | Control $R_A$ (cd/(lux·m$^2$)) | Example 1 $R_A$ (cd/(lux·m$^2$)) | Example 2 $R_A$ (cd/(lux·m$^2$)) |
|---|---|---|---|
| 0 | 442 | 354 | 349 |
| 5 | 714 | 590 | 583 |
| 10 | 762 | 688 | 665 |
| 15 | 677 | 644 | 639 |
| 20 | 635 | 607 | 601 |
| 25 | 732 | 715 | 709 |
| 30 | 717 | 758 | 732 |
| 35 | 753 | 811 | 725 |
| 40 | 778 | 813 | 707 |
| 45 | 700 | 816 | 710 |
| 50 | 757 | 804 | 705 |

Examples 3-8 and Comparative Examples C-F

Mixed colored inks formed according to the formulations specified in Table 4 were propeller mixed in glass jars, vacuum deaerated, and allowed to rest for 1 hr. Examples 3-8 included a cross-linking agent, which was added at an amount of 10 parts cross-linking agent to 100 parts ink system (and the ink included the polymer resin). The resulting mixed colored inks were coated using notch bar coating to a 0.001-inch thickness to the polyvinyl chloride (PVC) top film side of 3M™ SCOTCHLITE™ Reflective Material Series 6287 lime yellow retroreflective sheeting (available from 3M Company, St. Paul, Minn.) to form a continuous, colored image layer, and allowed to air dry at room temperature and atmospheric pressure for 48 hrs.

TABLE 4

| Ink | | Example: | | | | | | |
|---|---|---|---|---|---|---|---|---|
| | | 3 | 4 | 5 | | 6 | 7 | 8 |
| | | | | | Comp. Ex.: | | | |
| | | C | D | E | F | | | |
| 990-12 | Red | 40 | 40 | | | | | |
| 990-5 | Black | | | 40 | 40 | | | |
| 2905 | Black | | | | | 40 | 40 | |
| 9624 | Black | | | | | | 40 | 40 |
| 96PB22 | Blue | | | | | | 40 | |
| 96PB60 | Red | | | | | | | 40 |
| 9631 | Retarder | | 4 | | 4 | 4 | 4 | 4 |
| HDI-80 | Isocyanate | | | | | 4 | 4 | 4 |
| HDI-75 | Isocyanate | | 4 | | 4 | 4 | | |
| | Total | 40 | 44 | 40 | 44 | 40 | 44 | 44 | 48 | 48 | 48 |

Each of Examples 3-8 and Comparative Examples C-F were tested according to the adhesion test ("Adh") and the blocking test. In addition, Examples 3-6 and 8 were tested according to the chemical resistance test. The results of the adhesion testing ("Adh"), the block testing ("Anti-block"), and the chemical resistance testing ("Chemical") are reported in Table 5. As shown in Table 5, only the cross-linked image layers (i.e., Examples 3-8) passed both the adhesion and the blocking tests. The cross-linked image layers that were tested also passed the chemical resistance test.

TABLE 5

| Example/ Comp. Ex. | X-link | Adh | Anti-block 140 F. 24 h | Anti-block + 160 F. 24 h | Anti-block + 180 F. 24 h | Chemical |
|---|---|---|---|---|---|---|
| C | No | Pass | Fail | Fail | Fail | — |
| 3 | Yes | Pass | Pass | Pass | Pass | Pass |
| D | No | Pass | Pass | Fail | Fail | — |
| 4 | Yes | Pass | Pass | Pass | Pass | Pass |
| E | No | Pass | Pass | Fail | Fail | — |
| 5 | Yes | Pass | Pass | Pass | Pass | Pass |
| F | No | Pass | Pass | Fail | Fail | — |
| 6 | Yes | Pass | Pass | Pass | Pass | Pass |
| 7 | Yes | Pass | Pass | Pass | Pass | — |
| 8 | Yes | Pass | Pass | Pass | Pass | Pass |

Figure 5:
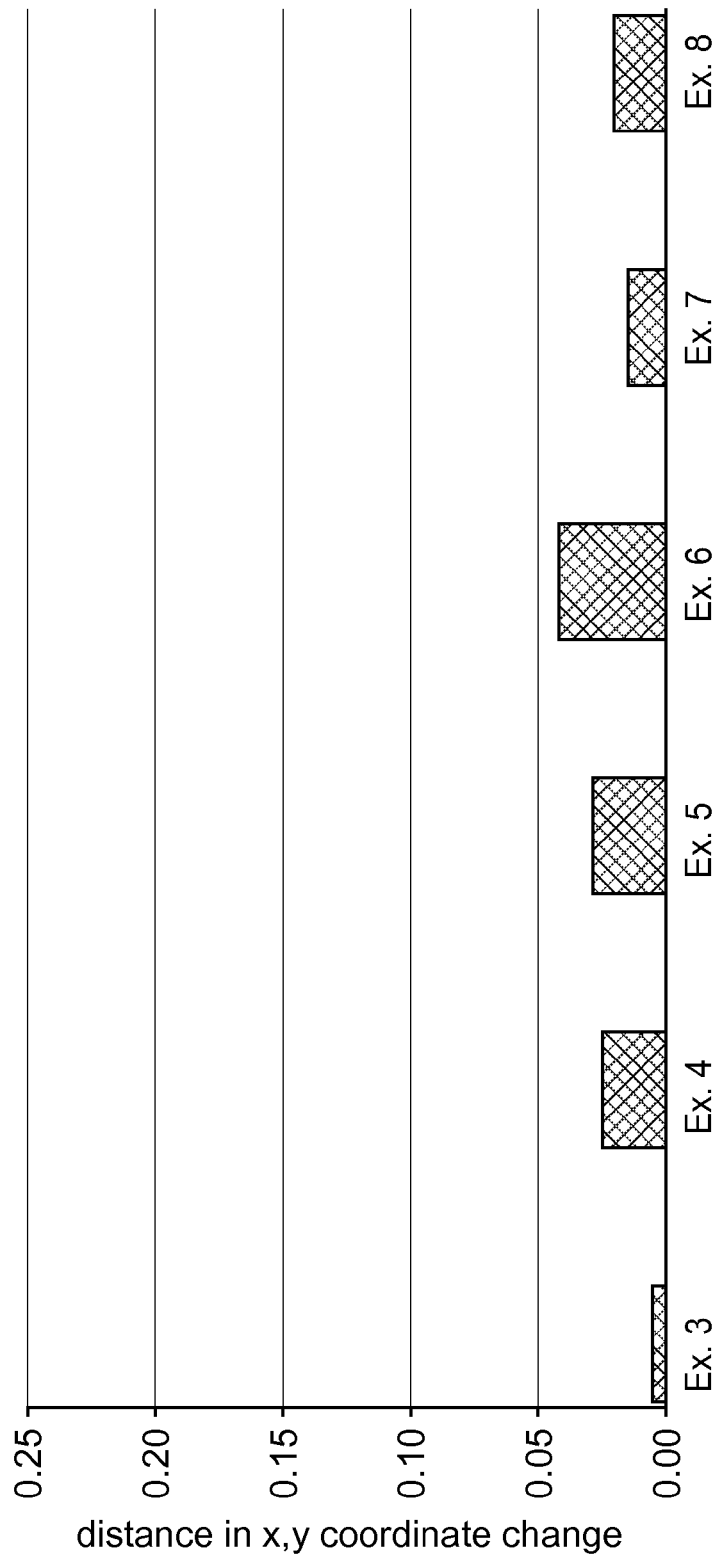
FIG. 5 illustrates x,y color shift of Examples 3-8 after 50 wash cycles.
Figure 6:
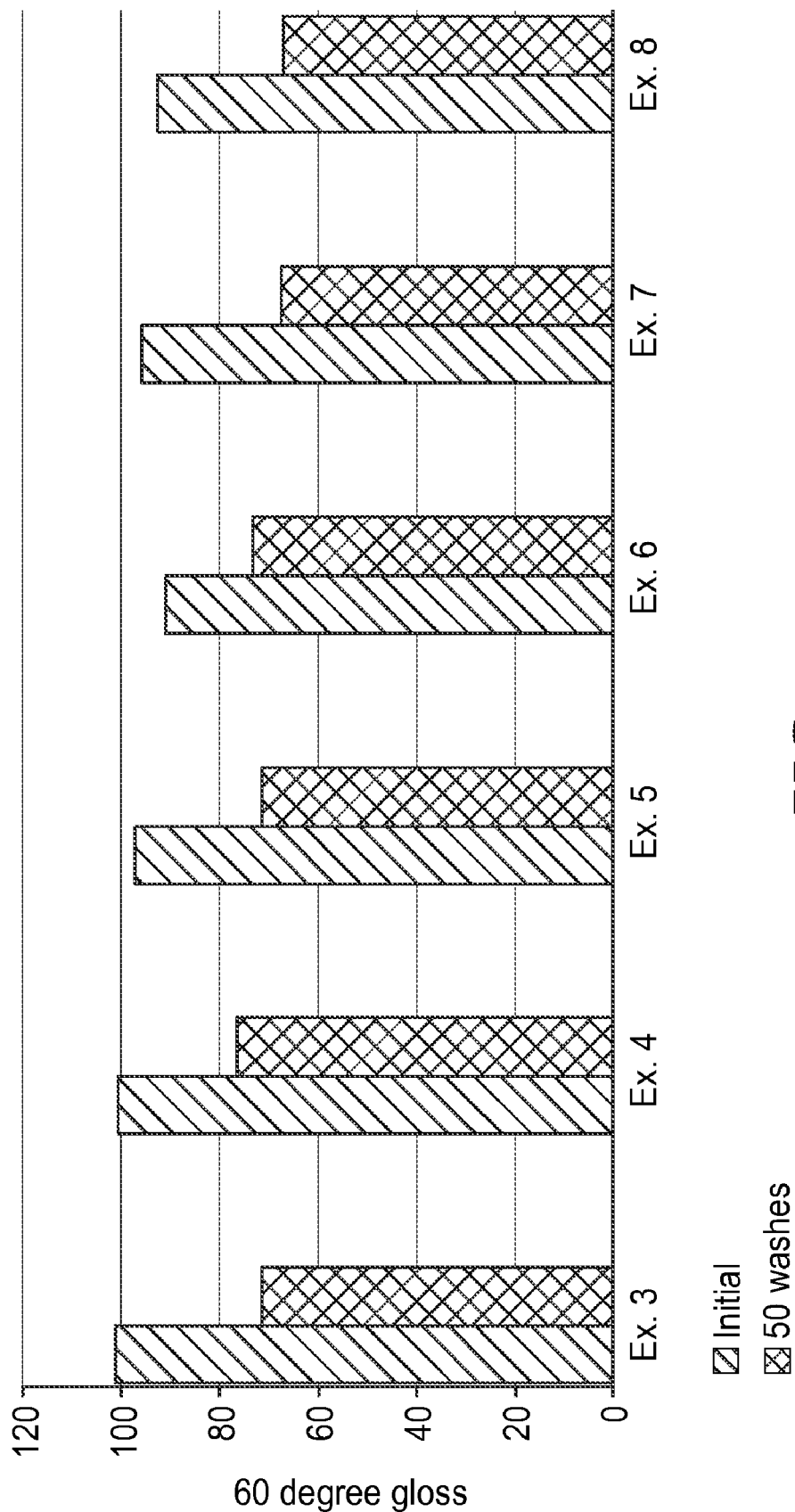
FIG. 6 illustrates the gloss of Examples 3-8 before and after 50 wash cycles.
Figure 7:
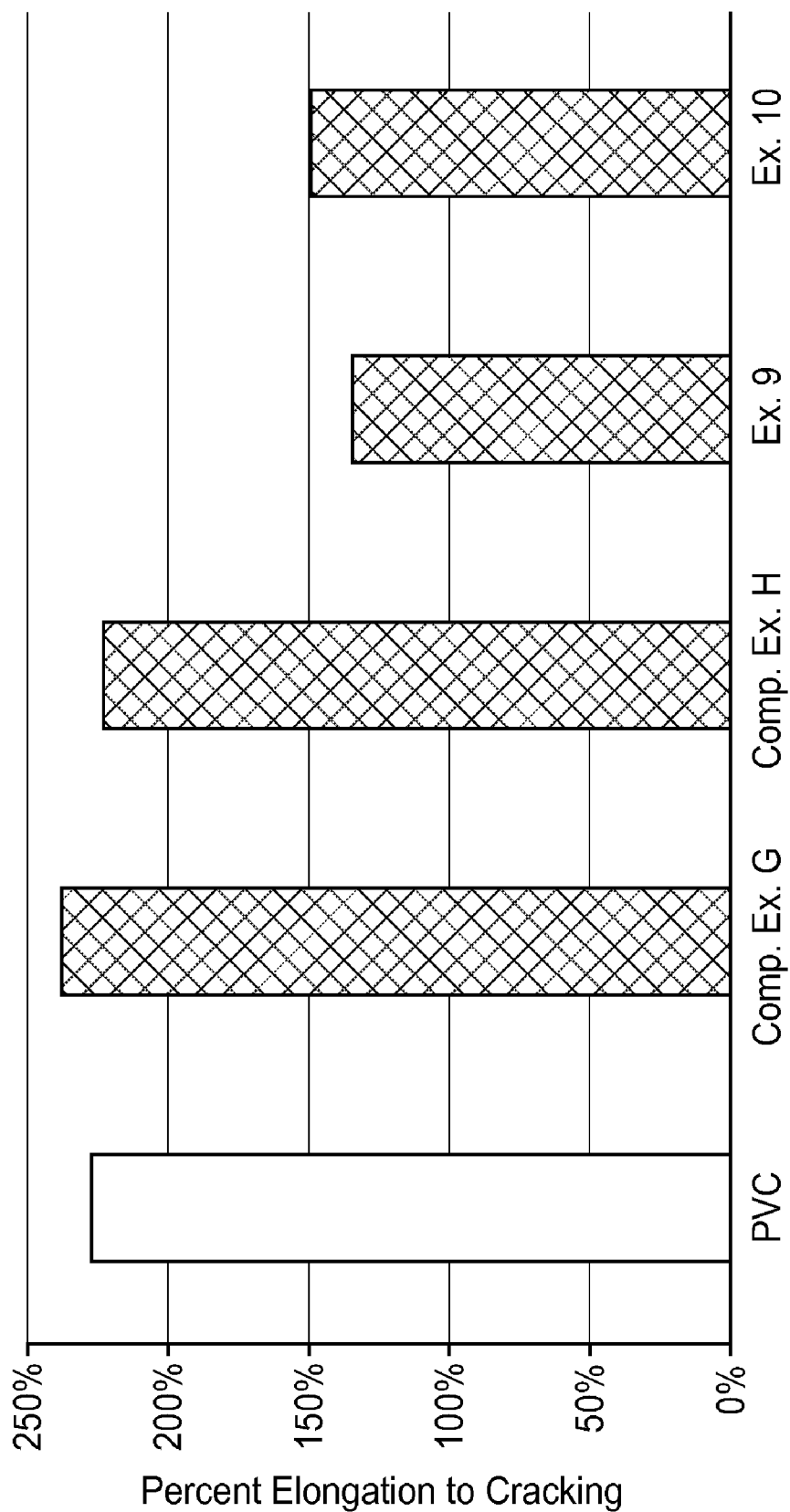
FIGS. 7-10 show the percent elongation for various cross-linked and uncrosslinked image layers, as compared to the control substrate, according to Examples 9-12, 17, 19-21, 24, 25 and 28 and Comparative Examples G-J, K and N.
Figure 8:
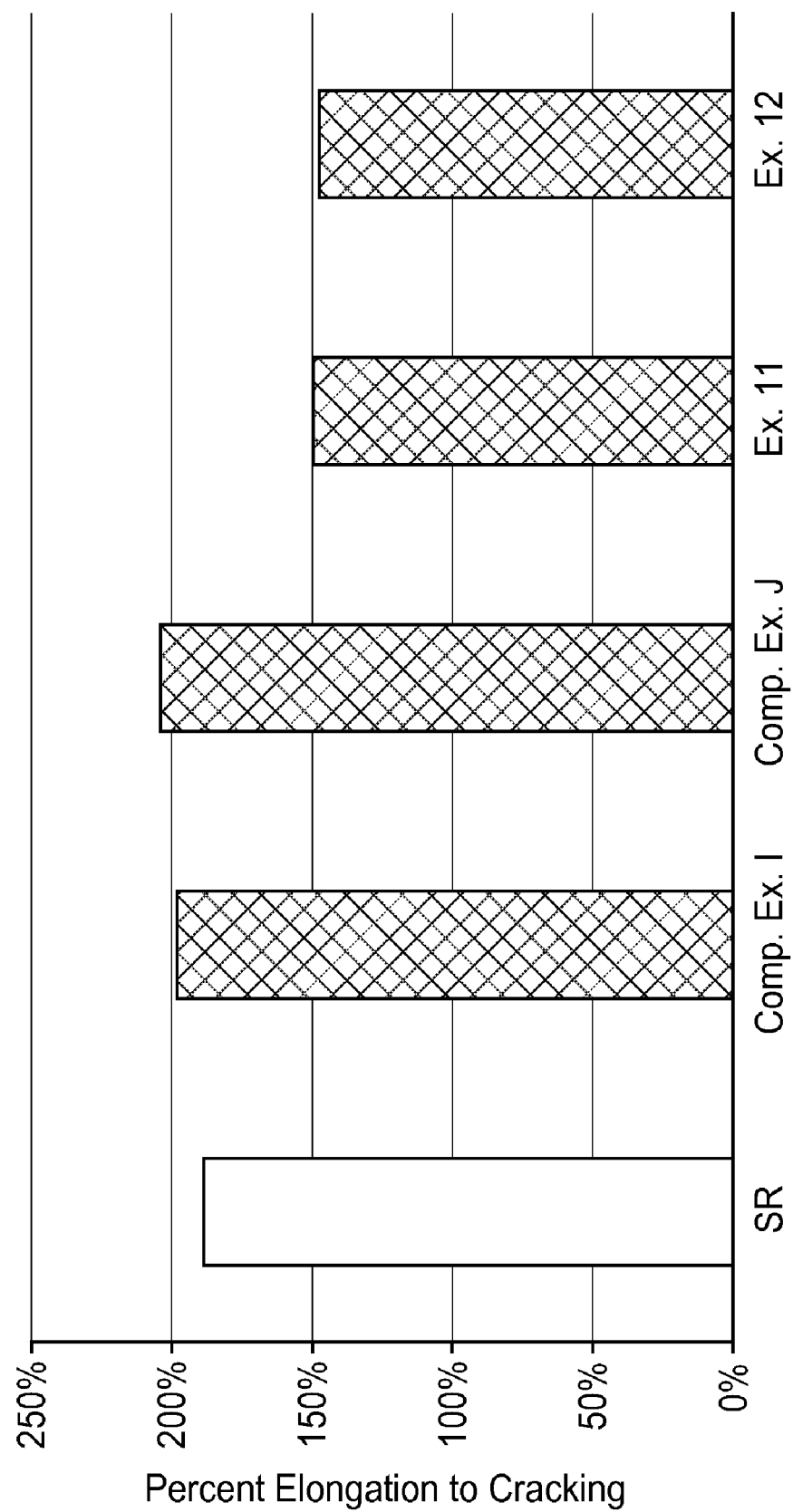
Figure 9:
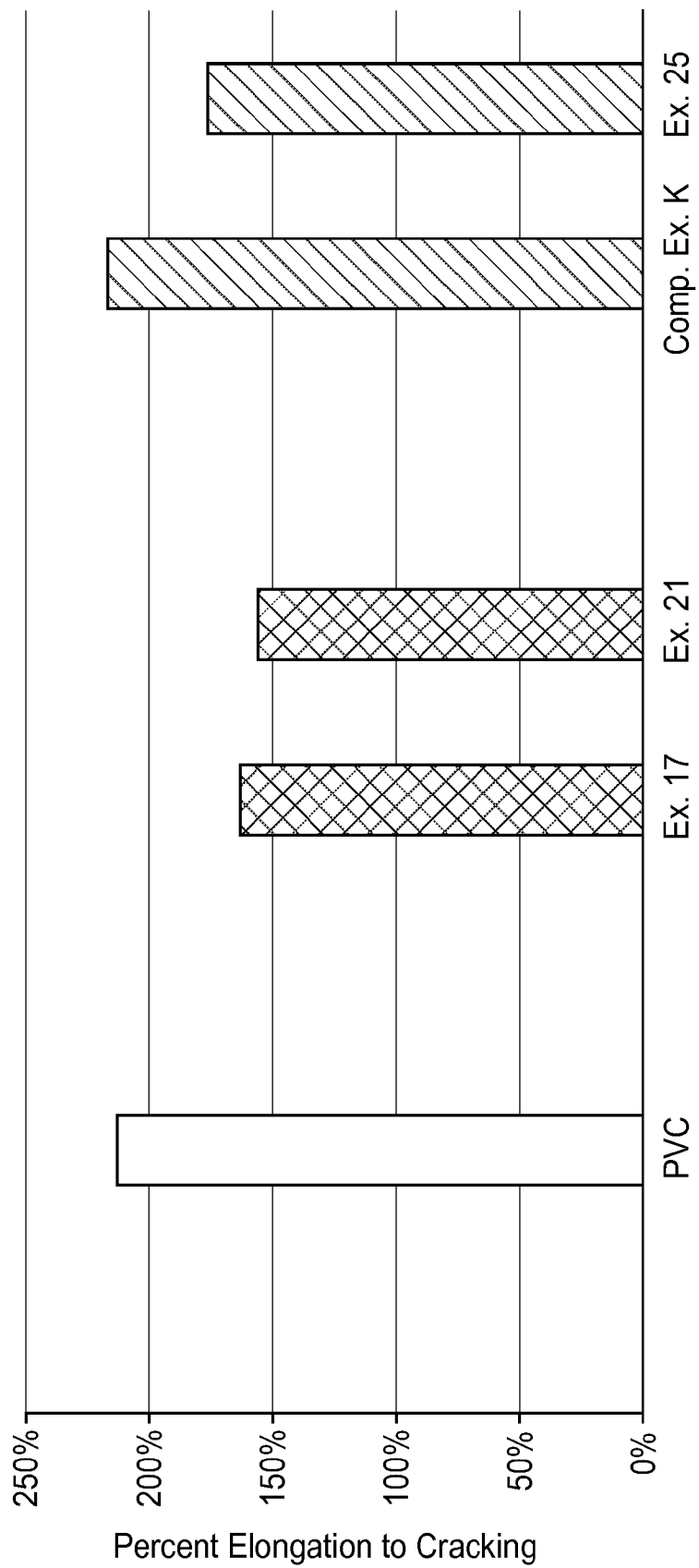
Figure 10:
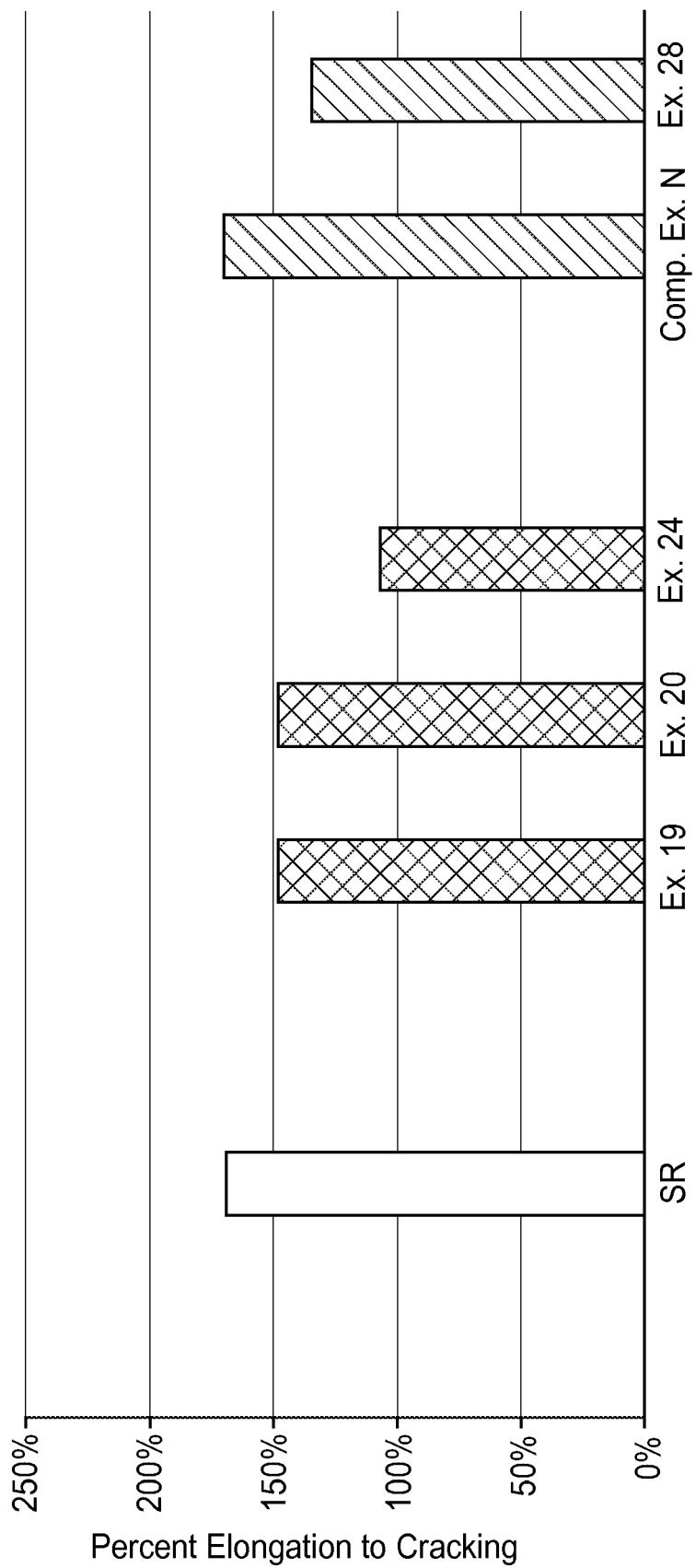

Only Examples 3-8 were further tested for wash resistance, in terms of x,y color shift and gloss retention. The results of the wash resistance testing in terms of x,y color shift are listed in Table 5A and displayed in FIG. 5, and the results of the wash resistance testing in terms of gloss retention are listed in Table 5B and displayed in FIG. 6. Each of the image layers according to Examples 3-8 had non-detectable wear (i.e., non-detectable to the human eye) and only slight gloss loss per instrumentation measurements.

TABLE 5A

| Example | x, y color shift After 50 washes (rounded to the nearest thousandth) |
|---|---|
| 3 | 0.005 |
| 4 | 0.025 |
| 5 | 0.029 |
| 6 | 0.042 |
| 7 | 0.015 |
| 8 | 0.020 |

TABLE 5B

| Example | 60 degree gloss Initial (rounded to the nearest tenth) | 60 degree gloss After 50 washes (rounded to the nearest tenth) |
|---|---|---|
| 3 | 101.5 | 71.4 |
| 4 | 100.7 | 76.7 |
| 5 | 97.1 | 71.8 |
| 6 | 90.9 | 73.3 |
| 7 | 96.3 | 67.4 |
| 8 | 92.8 | 67.4 |

Test Methods for Examples 9-32 and Comparative Examples G-R

Adhesion

The Adhesion tests were performed according to ASTM D3359. The image layer of a retroreflective article was scored through in a cross hatch pattern with a sharp razor blade, the parallel and perpendicular scores being spaced apart at intervals of about ⅛" (3 mm). A 1"×6" piece (0.03 m×0.15 m) of tape commercially available from 3M (St. Paul, Minn.) under the trade designation "3M Filament Tape 610" was contacted via a squeegee to the scored area of the image layer, followed by rapid removal at an orientation of 90 degrees relative to the surface of the image layer. To "pass" the adhesion test, a rating of 4 or 5 (according to the ASTM D3359-02 test procedure) was required.

Blocking

Block testing of the image layer was performed by folding 4"×6" (0.10 m×0.15 m) samples of the retroreflective sheeting comprising the image layer, such that there were areas of image layer to image layer contact, as well as image layer to substrate contact. A 200 g weight was placed atop the folded samples and the samples were placed in an oven for 72 hrs at 80° C. To pass the blocking test (i.e., to have "anti-block" properties), no ink transfer can be observed (either image layer to image layer or image layer to substrate).

Chemical Resistance

Chemical resistance testing of the image layer was performed by saturating a cloth (e.g., KIMTECH SCIENCE KIMWIPES® 2-ply Delicate Task Wipers with LINT-GUARD® anti-stat polyshield, available from Kimberly-Clark Corporation, Dallas, Tex.) with a solvent of interest and rubbing the saturated cloth back and forth 20 times (i.e., 20 "double rubs") across the surface of the image layer. Each of the following solvents were tested: mineral spirits, kerosene, and VM&P naphtha. To pass the chemical resistance test, the image layer needed to remain in tact and exhibit no visible smearing (i.e., as determined by visual observation), following the 20 double rubs.

Wash Durability

Samples were sewn to a cotton towel and subjected to home laundering using a MAYTAG® top loading washer (Model No. A2550676KK, available from Maytag, Benton Harbor, Mich.) with 4 lbs. (1.8 kg) of ballast. Samples were washed at 110° F. (43° C.) using a 10 minute wash cycle with the following settings: "Large" load, "Regular" fabric and "Hot/Cold" temperature. Thirty (30) g of a standard detergent "AATCC 1993" (available from the American Association of Textile Chemists and Colorists Technical Center, Research Triangle, N.C.) were used for each wash cycle. Each wash cycle was followed by a cold water rinse cycle. After every fifth wash/rinse cycle, each sample was tumble-dried in a MAYTAG® Model DE308 dryer, using machine settings of "REGULAR" temperature and "REGULAR" fabric until the total load was dry. Each sample then was tumble-dried for a 5-10 minute cooling period in the dryer with the heat turned off.

Wash durability was determined visually and recorded as the number of wash cycles that occurred before a significant amount of image layer removal occurred, up to 75 cycles. If no significant image layer removal was observed after 75 wash cycles, the wash durability was reported as ">75". If significant image layer removal occurred before 5 wash cycles, the wash durability was reported as "<5". Some examples/comparative examples survived only 25 washes, which was reported as "25".

Flexibility

Flexibility of the image layers was determined by testing the percent elongation of the image layer. The image layer was coupled to the retroreflective sheeting during testing, but front lighting was used to visualize when the image layer began to crack. The percent elongation was determined by testing a 1"×4" (0.03 m×0.10 m) strip of the solid colored portion of the samples (i.e., did not test across the text) in an INSTRON® materials testing system (Model No. 5565, available from Instron, Norwood, Mass.). Each end of the sample was mounted in rubber-faced jaws having a 1" (0.03 m) separation. The crosshead testing speed was 12"/min (0.3048 m/min.). The test was run until the first sign of cracks in the image layer were observed, at which point the crosshead was stopped.

Examples 9-32 and Comparative Examples G-R

Mixed colored inks formed according to the formulations specified in Table 6 were propeller mixed in glass jars. The ink manufacturer's recommended amount of thinner was added to the inks to reduce their viscosity for screen printing (i.e., 25 wt % CGS-50 thinner was added to 3M Series 2900 inks; 10 wt % 9630 thinner was added to NAZDAR® 9600 Series inks). Examples 9-32 included a cross-linking agent, which was added at an amount of 5 or 10 parts cross-linking agent to 100 parts ink system (which included the polymer resin). Comparative Examples G-R did not include a cross-linking agent.

The black inks supplied by 3M Company were screen printed onto a 12"×18" (0.30 m×0.46 m) substrate to form an image layer bearing a "3M Scotchlite™" text image using a PE157 mesh screen. The other resulting colored inks were reverse printed to form an image layer bearing a "POLICE" (i.e., the blue inks from 3M Company) and/or "EMERGENCY" (i.e., the red inks from 3M Company) text image onto an 18"×18" (0.46 m×0.46 m) substrate sized to accommodate the text (i.e., "POLICE" was printed on a 4"×12" (0.10 m×0.30 m) field and "EMERGENCY" was printed on a 4"×12" field) using a PE157 mesh screen. The black and colored inks from Nazdar were screen printed on a 4¾"×7½" (0.12 m×0.19 m) substrate by Nazdar using a PE230 mesh screen to form a continuous image layer having dimensions of 4¼"×6¾" (0.1 µm×0.17 m).

The substrate was either the PVC top film side of a 3M™ SCOTCHLITE™ Reflective Material Series 6200 retroreflective sheeting (available from 3M Company; identified as "PVC" in Tables 6 and 7 and FIGS. 7-10) or the barrier layer side of a 3M™ SCOTCHLITE™ Reflective Material Series 6100R or 7100 retroreflective sheeting (specifically, an intermediate 3M™ SCOTCHLITE™ Reflective Material Series 6100R or 7100 retroreflective sheeting was used that did not include a seal film; identified as "SR" in Tables 6 and 7 and FIGS. 7-10). The PVC substrates included a PVC top film without a barrier or bonding layer, whereas the SR substrates included a barrier layer and a bonding layer coupled to the front surface of a PVC top film. Specifically, the 3M™ SCOTCHLITE™ Reflective Material Series 6100R and 7100 retroreflective sheeting included a barrier layer formed of cross-linked polyurethane chemistries and a bonding layer formed of thermoplastic urethane that were tandem-coated, dried and heat-laminated to the PVC body portion of the prismatic retroreflective sheeting. The PVC substrates were wiped with isopropanol prior to screen printing, according to 3M recommendations for printing on the 3M™ SCOTCHLITE™ Reflective Material Series 6200 retroreflective sheeting.

Printed samples were either allowed to air dry for a minimum of 24 hrs, or the printed samples were oven dried at 150° F. (66° C.) for 90 seconds, prior to testing. The results of the Adhesion testing ("Adh"), the Block testing ("Block") and the Wash Durability testing ("Wash") are also reported in Table 6. As shown in Table 6, Examples 9-12 and Comparative Examples G-J were subjected to the Adhesion testing singly (i.e., not in duplicates), Examples 9-16 and Comparative Examples G-J were subjected to the Block testing (block testing was performed in triplicates, except for Example 10, in which only one sample was tested), and Examples 17-32 and Comparative Examples K-R were subjected to the Wash Durability testing singly. Examples 24 and 28 were also subjected to the Chemical resistance test singly, and both passed.

In Tables 6 and 7, a value of "0" in the "XL Agent" column means that no cross-linking agent was added, a value of "5" in the "XL Agent" column means that 5 parts cross-linking agent (i.e., HDI-80) to 100 parts ink system was added, and a value of "10" in the "XL Agent" column means that 10 parts cross-linking agent to 100 parts ink was added.

As further shown in Table 6, the best wash durability generally resulted from the cross-linked image layer being applied to the SR substrate. However, when 2913 was 10% cross-linked and oven-dried, it showed excellent wash durability on both the SR substrate (see Example 24) and the PVC substrate (see Example 22), which shows that some embodiments do perform well on substrates that include a body portion alone, without an additional barrier layer or bonding layer.

Uncrosslinked 2915 also showed excellent wash durability on SR, which may be attributable to the performance of the barrier layer. Solvents from the screen printing inks tend to have an affinity to PVC, and can migrate into the PVC body portion of the PVC substrate. Such solvents can become trapped in the PVC body portion and their presence can cause any ink printed thereon to soften and/or block. Without wishing to be bound by theory, one possible explanation for the wash durability of the uncrosslinked 2915 on SR could be that the SR layer inhibited the ink solvents from migrating into the PVC, thereby allowing the solvents to evaporate rather than migrating into the PVC and causing the ink to soften or block.

The phenomenon of solvents from the ink migrating into the PVC body portion of the PVC substrate may also explain why Example 22 (which was oven-dried) had greater wash durability when compared to its air-dried counterpart (i.e., Example 21), which only survived 25 wash cycles. Oven-drying may have forced the solvents out of the PVC body portion better than air-drying, which may have led to the greater wash durability. The Examples that survived 25 washes still show an improvement over most of the Comparative Examples.

The Examples that survived 25 wash cycles did not perform as well as those that survived at least 75 wash cycles, but this may be at least partly because the Examples that survived only 25 wash cycles were printed onto the PVC substrate and not on the protective barrier layer of the SR substrate. As a result, because the PVC body portion formed an exterior layer of the retroreflective article in the non-imaged portions of the Examples that were printed onto the PVC substrate, it is possible that only the imaged portions of the image layer had the improved durability. On the contrary, because the barrier layer formed an exterior layer of the retroreflective article in the non-imaged portions of the Examples that were printed onto the SR substrate, it is possible that the barrier layer also provided protection in the non-imaged portions.

In general, the difference between the air-dried samples and the oven-dried samples was not significant with respect to wash durability, except for Examples 21 and 22, as described above.

TABLE 6

| Ex. | Ink | Color | XL Agent | Dry | Substrate | Adh | Block | Wash |
|---|---|---|---|---|---|---|---|---|
| G | 2905 | Black | 0 | Air | PVC | Pass | Fail | |
| H | 2905 | Black | 0 | Oven | PVC | Pass | Fail | |
| I | 2905 | Black | 0 | Air | SR | Pass | Fail | |
| J | 2905 | Black | 0 | Oven | SR | Pass | Fail | |
| 9 | 2905 | Black | 10 | Air | PVC | Pass | Pass | |
| 10 | 2905 | Black | 10 | Oven | PVC | Pass | Pass | |
| 11 | 2905 | Black | 10 | Air | SR | Pass | Pass | |
| 12 | 2905 | Black | 10 | Oven | SR | Pass | Pass | |
| 13 | 9624 | Black | 10 | Air | PVC | | Pass | |
| 14 | 9624 | Black | 10 | Air | SR | | Pass | |
| 15 | 9652 | Black | 10 | Air | PVC | | Pass | |
| 16 | 9652 | Black | 10 | Air | SR | | Pass | |
| 17 | 2913 | Maroon | 5 | Air | PVC | | | 25 |
| 18 | 2913 | Maroon | 5 | Oven | PVC | | | 25 |
| 19 | 2913 | Maroon | 5 | Air | SR | | | >75 |
| 20 | 2913 | Maroon | 5 | Oven | SR | | | >75 |
| 21 | 2913 | Maroon | 10 | Air | PVC | | | 25 |
| 22 | 2913 | Maroon | 10 | Oven | PVC | | | >75 |
| 23 | 2913 | Maroon | 10 | Air | SR | | | >75 |
| 24 | 2913 | Maroon | 10 | Oven | SR | | | >75 |
| K | 2915 | Cyan | 0 | Air | PVC | | | <5 |
| L | 2915 | Cyan | 0 | Oven | PVC | | | <5 |
| M | 2915 | Cyan | 0 | Air | SR | | | >75 |
| N | 2915 | Cyan | 0 | Oven | SR | | | >75 |
| 25 | 2915 | Cyan | 5 | Air | PVC | | | 25 |
| 26 | 2915 | Cyan | 5 | Oven | PVC | | | 25 |
| 27 | 2915 | Cyan | 5 | Air | SR | | | >75 |
| 28 | 2915 | Cyan | 5 | Oven | SR | | | >75 |
| O | 96PB60 | Red | 0 | Air | PVC | | | <5 |
| P | 96PB60 | Red | 0 | Oven | PVC | | | <5 |
| Q | 96PB60 | Red | 0 | Air | SR | | | <5 |

TABLE 6-continued

| Ex. | Ink | Color | XL Agent | Dry | Substrate | Adh | Block | Wash |
|---|---|---|---|---|---|---|---|---|
| R | 96PB60 | Red | 0 | Oven | SR | | | <5 |
| 29 | 96PB60 | Red | 10 | Air | PVC | | | 25 |
| 30 | 96PB60 | Red | 10 | Oven | PVC | | | 25 |
| 31 | 96PB22 | Blue | 10 | Air | SR | | | >75 |
| 32 | 96PB60 | Red | 10 | Oven | SR | | | >75 |

Examples 9-12, 17, 19-21, 24, 25 and 28 and Comparative Examples G-J, K and N were further tested (in duplicates) for flexibility and compared to the base substrate (either the PVC substrate or the SR substrate, as defined above). The results of those tests are listed in Table 7 and shown in FIGS. 7-10.

In general, the cross-linked image layers on the PVC substrate or the SR substrate having a percent elongation of less than 200%, and particularly less than 150%, passed the blocking tests. In addition, in general, the cross-linked image layers on the PVC substrate having a percent elongation of less than 200%, and particularly less than 175%, survived at least 25 wash cycles. Furthermore, in general, the cross-linked image layers on the SR substrate having a percent elongation of less than 175%, and particularly less than 150%, survived at least 75 wash cycles. Finally, in general, the cross-linked image layers on the SR substrate had a lower percent elongation when applied to the SR substrate than the PVC substrate and had better wash durability. However, the cross-linked image layers on the SR substrate maintained a percent elongation of at least 80%, and more particularly, at least 100%.

TABLE 7

| Ex. | Ink | Color | X-link | Dry | Substrate | Avg Load; lb/in. (kg/m) | Avg Disp to Crack; in. (m) | Elong to Crack (%) |
|---|---|---|---|---|---|---|---|---|
| PVC | None | — | — | — | PVC | 19.806 (353.69) | 2.272 (0.0577) | 227% |
| G | 2905 | Black | 0 | Air | PVC | 19.503 (348.28) | 2.378 (0.0604) | 238% |
| H | 2905 | Black | 0 | Oven | PVC | 19.557 (349.25) | 2.230 (0.0566) | 223% |
| 9 | 2905 | Black | 10 | Air | PVC | 16.827 (300.50) | 1.345 (0.0342) | 135% |
| 10 | 2905 | Black | 10 | Oven | PVC | 17.233 (307.75) | 1.491 (0.0379) | 149% |
| SR | None | — | — | — | SR | 23.321 (416.47) | 1.876 (0.0477) | 188% |
| I | 2905 | Black | 0 | Air | SR | 25.544 (456.16) | 1.970 (0.0500) | 197% |
| J | 2905 | Black | 0 | Oven | SR | 22.890 (408.77) | 2.028 (0.0515) | 203% |
| 11 | 2905 | Black | 10 | Air | SR | 22.077 (394.25) | 1.488 (0.0378) | 149% |
| 12 | 2905 | Black | 10 | Oven | SR | 22.134 (395.27) | 1.466 (0.0372) | 147% |
| PVC | None | — | — | — | PVC | 18.728 (334.44) | 2.130 (0.0541) | 213% |
| 17 | 2913 | Maroon | 5 | Air | PVC | 16.969 (303.03) | 1.632 (0.0415) | 163% |
| 21 | 2913 | Maroon | 10 | Air | PVC | 17.548 (313.37) | 1.560 (0.0396) | 156% |
| K | 2915 | Cyan | 0 | Air | PVC | 18.990 (339.12) | 2.168 (0.0551) | 217% |
| 25 | 2915 | Cyan | 5 | Air | PVC | 17.391 (310.57) | 1.764 (0.0448) | 176% |
| SR | None | — | — | — | SR | 29.545 (527.61) | 1.690 (0.0429) | 169% |
| 19 | 2913 | Maroon | 5 | Air | SR | 29.665 (529.76) | 1.480 (0.0376) | 148% |
| 20 | 2913 | Maroon | 5 | Oven | SR | 29.812 (532.38) | 1.480 (0.0376) | 148% |
| 24 | 2913 | Maroon | 10 | Oven | SR | 26.485 (472.97) | 1.067 (0.0271) | 107% |
| N | 2915 | Cyan | 0 | Oven | SR | 29.948 (534.81) | 1.700 (0.0432) | 170% |
| 28 | 2915 | Cyan | 5 | Oven | SR | 28.523 (509.36) | 1.374 (0.0349) | 137% |

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the present disclosure are set forth in the following claims.

What is claimed is:

1. A prismatic retroreflective article comprising:
    a transparent polymeric body portion having an elastic modulus less than $13 \times 10^8$ Pa (1.3 GPa);
    an optical layer comprising internally reflecting cube-corner optical elements, the optical layer having an elastic modulus greater than $14 \times 10^8$ Pa (1.4 GPa) and being coupled to the body portion; and
    an image layer coupled to the body portion opposite the optical layer, the image layer defining an image having imaged portions and non-imaged portions, wherein the image layer forms an exterior layer of the prismatic retroreflective article in the imaged portions, the image layer including cross-links formed between a polymer resin having hydroxyl functional groups and a cross-linking agent having isocyanate functional groups, the polymer resin comprising at least one of a polyester and a vinyl copolymer.

2. The prismatic retroreflective article of claim 1, wherein the prismatic retroreflective article has a retroreflectivity of at least 330 cd/(lux·m$^2$) as measured according to ASTM E-810 test method or CIE 54.2; 2001 test method at 0.2 degree observation angle and +5 degree entrance angle, at 0 degrees and 90 degrees orientation angles.

3. The prismatic retroreflective article of claim 1, wherein the polymer resin comprises a vinyl copolymer.

4. The prismatic retroreflective article of claim 1, wherein the polymer resin comprises a vinyl copolymer, and wherein the polymer resin further comprises an acrylic resin.

5. The prismatic retroreflective article of claim 1, wherein the cross-linking agent comprises at least one of aliphatic isocyanates, aliphatic polyfunctional isocyanates, cycloaliphatic polyfunctional isocyanates, and combinations thereof.

6. The prismatic retroreflective article of claim 1, wherein the cross-linking agent comprises at least one of 1,6-hexamethylene diisocyanate (HDI), 1,4-tetramethylene diisocyanate, and combinations thereof.

7. The prismatic retroreflective article of claim 1, wherein the image layer has a percent elongation of at least 80 percent.

8. The prismatic retroreflective article of claim 1, wherein the image layer has a percent elongation of less than 200 percent.

9. The prismatic retroreflective article of claim 1, wherein the image layer has a percent elongation of at least 100 percent and less than 150 percent.

10. The prismatic retroreflective article of claim 1, wherein the vinyl copolymer comprises a vinyl acetate-vinyl alcohol-vinyl chloride copolymer.

11. The prismatic retroreflective article of claim 1, further comprising a barrier layer disposed between the image layer and the body portion, such that the barrier layer forms an exterior layer of the prismatic retroreflective article in the non-imaged portions.

12. The prismatic retroreflective article of claim 11, wherein the barrier layer comprises at least one of polyurethanes, polyurethane acrylates, and polyacrylates.

13. The prismatic retroreflective article of claim 1, wherein the amount of cross-linking agent is at least 3% and no more than 45%, based on the weight of the image layer.

14. The prismatic retroreflective article of claim 1, wherein the amount of cross-linking agent is at least 15% and no more than 30%, based on the weight of the image layer.

15. A method of making a prismatic retroreflective article, the method comprising:
    providing retroreflective sheeting, the retroreflective sheeting including
        a body portion having an elastic modulus of less than $13 \times 10^8$ Pa, and
        an optical layer comprising internally reflecting cube-corner optical elements, the optical layer having an elastic modulus of greater than $14 \times 10^8$ Pa and being coupled to the body portion;
    printing or coating an image layer onto to the body portion of the retroreflective sheeting opposite the optical layer, the image layer comprising
        a polymer resin comprising at least one of a polyester and a vinyl copolymer, the polymer resin having hydroxyl functional groups, and
        a cross-linking agent having isocyanate functional groups; and
    cross-linking the image layer to form cross-links between the hydroxyl functional groups of the polymer resin and the isocyanate functional groups of the cross-linking agent.

16. The method of claim 15, further comprising drying the image layer via oven drying.

17. The method of claim 15, further comprising drying the image layer via air drying.

18. The method of claim 15, wherein the prismatic retroreflective article has a retroreflectivity of at least 330 cd/(lux·m$^2$) as measured according to ASTM E-810 test method or CIE 54.2; 2001 test method at 0.2 degree observation angle and +5 degree entrance angle, at 0 degrees and 90 degrees orientation angles.

19. The method of claim 15, wherein the polymer resin comprises a vinyl copolymer.

20. The method of claim 15, wherein the polymer resin comprises a vinyl copolymer, and the polymer resin further comprises an acrylic resin.

21. The method of claim 15, wherein cross-linking the image layer includes cross-linking the image layer to form an image layer having a percent elongation of at least 80 percent.

22. The method of claim 15, wherein cross-linking the image layer includes cross-linking the image layer to form an image layer having a percent elongation of less than 200 percent.

23. The method of claim 15, wherein cross-linking the image layer includes cross-linking the image layer to form an image layer having a percent elongation of at least 100 percent and less than 150 percent.

24. The method of claim 15, wherein printing or coating the image layer includes forming an image having imaged portions and non-imaged portions, and wherein the image layer forms an exterior layer of the prismatic retroreflective article in the imaged portions.

25. The method of claim 15, wherein the retroreflective sheeting further comprises a barrier layer coupled to the body portion opposite the optical layer, and wherein printing or coating the image layer includes forming an image having imaged portions and non-imaged portions, such that the image layer forms the exterior layer of the prismatic retroreflective article in the imaged portions and the barrier layer forms the exterior layer of the prismatic retroreflective article in the non-imaged portions.

26. The method of claim 15, wherein the retroreflective sheeting further comprises a barrier layer comprising cross-linked polyurethane chemistries coupled to the body portion opposite the optical layer.

27. The method of claim 15, wherein printing or coating an image layer includes printing or coating an ink system that comprises at least 2 parts cross-linking agent per 100 parts ink system, and no more than 15 parts cross-linking agent per 100 parts ink system.

28. The method of claim 15, wherein printing or coating an image layer includes printing or coating an image layer that comprises at least 3% cross-linking agent solids to image layer solids, and no more than 45% cross-linking agent solids to image layer solids.

29. The method of claim 15, wherein cross-linking the image layer comprises chemically cross-linking the image layer.

30. A prismatic retroreflective article comprising:
- a transparent polymeric body portion having an elastic modulus less than $13 \times 10^8$ Pa (1.3 GPa);
- an optical layer comprising internally reflecting cube-corner optical elements, the optical layer having an elastic modulus greater than $14 \times 10^8$ Pa (1.4 GPa) and being coupled to the body portion; and
- an image layer coupled to the body portion opposite the optical layer, the image layer having a percent elongation of at least 80 percent and less than 200 percent, the image layer including cross-links formed between a polymer resin having hydroxyl functional groups and a cross-linking agent having isocyanate functional groups, the polymer resin comprising at least one of a polyester and a vinyl copolymer.

* * * * *

UNITED STATES PATENT AND TRADEMARK OFFICE
CERTIFICATE OF CORRECTION

PATENT NO.       : 7,547,105 B2                               Page 1 of 1
APPLICATION NO.  : 11/778216
DATED            : June 16, 2009
INVENTOR(S)      : Chester A. Bacon, Jr. et al.

It is certified that error appears in the above-identified patent and that said Letters Patent is hereby corrected as shown below:

Cover Page
Col. 2, Abstract, line 12, After "onto" Delete "to".

Column 5
Line 24, Delete "coploymers," and insert -- copolymers, --, therefor.

Column 6
Line 2, Delete "about $5 \times 10^8$, about $9 \times 10^8$, about $11 \times 10^8$, and about $13 \times 10^8$." and insert -- about $5 \times 10^8$ Pa, about $9 \times 10^8$ Pa, about $11 \times 10^8$ Pa, and about $13 \times 10^8$ Pa. --, therefor.

Line 12, Delete "fluororide);" and insert -- fluoride); --, therefor.

Column 9
Line 26-27, Delete "isocyanatomethycyclohexane)," and insert
-- isocyanatomethylcyclohexane), --, therefor.

Column 11
Line 25, Delete "comformability." and insert -- conformability. --, therefor.

Column 15
Line 5-6, Delete "calorimeter" and insert -- colorimeter --, therefor.

Column 21
Line 11, Delete "(0.1 μmx0.17 m)." and insert -- (0.11 mx0.17 m). --, therefor.

Signed and Sealed this

Twenty-second Day of September, 2009

David J. Kappos
*Director of the United States Patent and Trademark Office*